United States Patent
Akagi et al.

(10) Patent No.: US 9,780,391 B2
(45) Date of Patent: Oct. 3, 2017

(54) SOLID OXIDE FUEL CELL DEVICE

(71) Applicant: TOTO LTD., Kitakyushu-shi, Fukuoka (JP)

(72) Inventors: Yousuke Akagi, Chigasaki (JP); Toshiya Abe, Chigasaki (JP); Toshiharu Otsuka, Nakama (JP); Katsuhisa Tsuchiya, Chigasaki (JP); Takuya Matsuo, Yokohama (JP); Naoki Watanabe, Chigasaki (JP); Hajime Omura, Kanagawa (JP); Shuhei Tanaka, Chigasaki (JP); Takuya Hoshiko, Kanagawa (JP)

(73) Assignee: TOTO LTD., Kitakyushu, Fukuoka (JP)

( * ) Notice: Subject to any disclaimer, the term of this patent is extended or adjusted under 35 U.S.C. 154(b) by 156 days.

(21) Appl. No.: 13/944,289

(22) Filed: Jul. 17, 2013

(65) Prior Publication Data
US 2014/0023946 A1 Jan. 23, 2014

(30) Foreign Application Priority Data

Jul. 19, 2012 (JP) ................................ 2012-160898
Jul. 19, 2012 (JP) ................................ 2012-160899

(51) Int. Cl.
*H01M 8/04014* (2016.01)
*H01M 8/04828* (2016.01)
(Continued)

(52) U.S. Cl.
CPC ......... *H01M 8/04022* (2013.01); *C01B 3/382* (2013.01); *H01M 8/04753* (2013.01);
(Continued)

(58) Field of Classification Search
CPC ....... H01M 8/12; H01M 2/02; H01M 8/04007
See application file for complete search history.

(56) References Cited

U.S. PATENT DOCUMENTS 6,521,204 B1* 2/2003 Borup .................... B01B 1/005
423/651
7,815,699 B2 10/2010 Skala et al.
(Continued)

FOREIGN PATENT DOCUMENTS

EP 2 233 431 A1 9/2010
EP 2233431 A1 * 9/2010
(Continued)

OTHER PUBLICATIONS

Extended European Search Report in corresponding European Application No. 13176870.7, dated Jul. 23, 2014, 7 pages.
(Continued)

*Primary Examiner* — Ula C Ruddock
*Assistant Examiner* — Gregory Passa
(74) *Attorney, Agent, or Firm* — Brinks Gilson & Lione

(57) ABSTRACT

To provide a fuel cell device capable of extending the years of service life of a reformer by suppressing thermal runaways. The present invention is a solid oxide fuel cell device, including a fuel cell module having fuel cell units; a reformer disposed above the fuel cell units, for producing hydrogen by a partial oxidation reforming reaction and a steam reforming reaction; a vaporizing chamber disposed adjacent to the reformer; a combustion chamber for heating the vaporization chamber; a water supply device; an electrical generation oxidant gas supply device; and a controller for raising the fuel cell units to a temperature at which electrical generation is possible; whereby over the entire period of the startup step, the reforming oxidant gas supply device and water supply device are controlled so that partial oxidation reforming reactions do not occur independently in the reformer.

13 Claims, 12 Drawing Sheets

(51) Int. Cl.
*H01M 8/0612* (2016.01)
*H01M 8/2425* (2016.01)
*H01M 8/04746* (2016.01)
*C01B 3/38* (2006.01)

(52) U.S. Cl.
CPC ... *H01M 8/04776* (2013.01); *H01M 8/04828* (2013.01); *H01M 8/0618* (2013.01); *H01M 8/0631* (2013.01); *H01M 8/2425* (2013.01); *C01B 2203/025* (2013.01); *C01B 2203/0233* (2013.01); *C01B 2203/0244* (2013.01); *C01B 2203/0283* (2013.01); *C01B 2203/067* (2013.01); *C01B 2203/0816* (2013.01); *C01B 2203/0822* (2013.01); *C01B 2203/1294* (2013.01); *C01B 2203/1604* (2013.01); *C01B 2203/169* (2013.01); *Y02E 60/566* (2013.01); *Y02P 20/128* (2015.11)

(56) References Cited

U.S. PATENT DOCUMENTS

| | | | |
|---|---|---|---|
| 8,431,274 | B2 | 4/2013 | Watanabe et al. |
| 2005/0081445 | A1* | 4/2005 | Skala ............... B01D 19/001 48/214 A |
| 2010/0279185 | A1 | 11/2010 | Hatada |
| 2010/0304245 | A1* | 12/2010 | Tsuchiya ........... H01M 8/04223 429/423 |
| 2012/0015262 | A1 | 1/2012 | Watanabe et al. |
| 2012/0156579 | A1 | 6/2012 | Yabutani |
| 2014/0315112 | A1 | 10/2014 | Ibuka et al. |

FOREIGN PATENT DOCUMENTS

| | | |
|---|---|---|
| EP | 2 416 419 A1 | 2/2012 |
| EP | 2 466 677 A1 | 6/2012 |
| EP | 2 830 134 A1 | 1/2015 |
| JP | 2000-281310 A | 10/2000 |
| JP | 2004-319420 A | 11/2004 |
| JP | 2005-285621 A | 10/2005 |
| JP | 2012-089293 A | 5/2012 |
| JP | 2011-245892 | 4/2015 |

OTHER PUBLICATIONS

Office Action in corresponding European Application No. 13176870.7, dated Oct. 24, 2016, 9 pages.

* cited by examiner

FIG.13

| MODE | STATE | STATE TRANSITION CONDITION (°C) | | FUEL FLOW AMOUNT (L/min) | REFORMING AIR FLOW AMOUNT (L/min) | GENERATING AIR FLOW AMOUNT (L/min) | PURE WATER FLOW AMOUNT (cc/min) | $O_2/C$ | $S/C$ |
| --- | --- | --- | --- | --- | --- | --- | --- | --- | --- |
| | | REFORMER TEMPERATURE | STACK TEMPERATURE | | | | | | |
| STARTUP MODE | PREPURGE | TERMINATION OF PREPURGE TIME PERIOD | | 0.0 | 0.0 | 100.0 | 3.0 | 0.00 | 0.00 |
| | IGNITION | ≧+10°C | – | 5.0 | 10.0 | 100.0 | 0.0 | 0.32 | 0.00 |
| | ATR1 | ≧500°C | – | 5.0 | 9.0 | 100.0 | 2.0 | 0.32 | 0.43 |
| | ATR2 | – | ≧400°C | 5.0 | 9.0 | 100.0 | 3.0 | 0.32 | 0.64 |
| | ATR3 | – | ≧550°C | 4.0 | 6.5 | 100.0 | 3.0 | 0.29 | 0.80 |
| | SR1 | – | ≧600°C | 3.0 | 0.0 | 100.0 | 7.0 | 0.00 | 2.49 |
| | SR2 | – | – | 2.5 | 0.0 | 80.0 | 6.0 | 0.00 | 2.56 |

…

SOLID OXIDE FUEL CELL DEVICE

RELATED APPLICATIONS

This application claims priority under 35 U.S.C. §119 to Japanese Patent Application Nos. 2012-160898 and 2012-160899 both filed on Jul. 19, 2012, the entire content of which is hereby incorporated by reference.

BACKGROUND OF THE INVENTION

1. Field of the Invention

The present invention pertains to a solid oxide fuel cell device, and more particularly to a solid oxide fuel cell device in which electrical power is produced by reacting fuel and oxidant gas for electrical generation.

2. Description of the Related Art

A fuel cell apparatus and operating method for same is described in Patent Application JP 2004-319420A (Patent Document 1). The fuel cell apparatus set forth here is constituted to pass through multiple steps for reforming fuel in a reformer, being: a partial oxidation reforming reaction step (the POX step), an auto thermal reforming reaction step (the ATR step), and a steam reforming reaction step (the SR step), then transition to electrical power generation.

In the fuel cell apparatus set forth in Patent Document 1, a reformer is disposed within a fuel cell module; this reformer is heated by combusting, at the top end portion of each fuel cell, the fuel gas (off-gas) which has remained unused for electrical generation in each of the fuel cells. Note, that in the present application, the type of fuel cell device in which off-gas combustion heat is used to heat the reformer to a temperature at which reforming is possible is referred to as an "off-gas fuel cell burner type" of fuel cell device.

In such off-gas fuel cell burner-type fuel cell device, heating of a reformer at room temperature is done at startup by combusting off-gas (because electrical generation is not done at startup, this corresponds to all the supplied fuel). When the catalyst temperature inside the reformer is raised to approximately 300° C. by this heating, a partial oxidation reforming reaction (the POX step) occurs in the reformer, in which fuel and reforming air are reacted. Because the partial oxidation reforming reaction is an exothermic reaction, when a partial oxidation reforming reaction occurs inside the reformer, the reformer is strongly heated by this reaction heat and off-gas combustion heat.

When the reformer temperature further rises due to this heating, reforming steam is supplied into the reformer, and in the reformer a steam reforming reaction occurs in which fuel and steam react. This steam reforming reaction is one in which hydrogen can be more efficiently produced than in the partial oxidation reforming reaction, but it does not occur unless the temperature of the catalyst in the reformer rises to approximately 600° C. Also, because the steam reforming reaction is an endothermic reaction, the catalyst temperature drops rapidly if the temperature of the reformer and inside the fuel cell module has not risen sufficiently, and stable steam reforming cannot be performed. In a fuel cell device of the off-gas combustion burner type, air and steam for reforming is supplied to the reformer after the POX step has been performed, and the partial oxidation reforming reaction and steam reforming reaction are caused to occur simultaneously within the reformer (the ATR step). In this ATR step, the temperatures inside the reformer and the fuel cell module are raised while maintaining an appropriate balance between the exothermic heat from the partial oxidation reforming reaction, the endothermic heat from the steam reforming reaction, and the off-gas combustion heat.

When the temperature inside the reformer and the fuel cell module rise sufficiently due to the ATR step, supply of reforming air is stopped, and in the reformer only the steam reforming reaction takes place (the SR step). Thereafter, when the temperature of each fuel cell is raised by the SR step to a temperature at which electrical generation is possible, the fuel cell device transitions to the electrical generation step, wherein hydrogen is only produced by the steam reforming reaction.

Thus, in oxidant gas combustion cell burner types of fuel cell device not provided with a dedicated means for heating the reformer, the reformer is rapidly heated from room temperature by the POX step, which utilizes a partial oxidation reforming reaction occurring at a comparatively low temperature, following which reforming (the ATR and SR steps) using the steam reforming reaction is executed.

PATENT REFERENCES

Patent Document 1: JP 2004-319420 A

SUMMARY OF THE INVENTION

However, because the partial oxidation reforming reaction in the POX step produces a large amount of heat, when the partial oxidation reforming reaction occurs, the temperature of the surrounding catalyst also rises rapidly. When the catalyst temperature rises in this way, the partial oxidation reforming reaction is even further promoted in that part, and the high temperature part is still further heated. The problem, therefore, arises that in the POX step, a thermal runaway state can easily occur inside the reformer. When such a thermal runaway state occurs, the reformer temperature rises excessively in a localized manner before the overall reformer temperature rises sufficiently. If this state continues for a long period, the usable life of the reformer may be shortened by degradation of the reforming catalyst, or the reformer may be damaged.

Therefore, the present invention has the object of providing a solid oxide fuel cell device capable of extending the number of years of service life of the reformer, or of preventing damage to the reformer, by quickly raising the temperature inside the reformer while suppressing thermal runaway.

In order to resolve the above-described problems, the present invention is a solid oxide fuel cell device, in which fuel is supplied to a fuel cell units and the remaining fuel flown out from one end of the fuel cell units is combusted to heat a reformer, the solid oxide fuel cell device comprising: a fuel cell module including plurality of fuel cell units in which fuel electrodes are formed in internal passages for passing fuel; a reformer disposed above the plurality of fuel cell units within the fuel cell module, for producing hydrogen by a partial oxidation reforming reaction resulting from the chemical reaction of fuel and reforming oxidant gas and a steam reforming reaction resulting from the chemical reaction of fuel and reforming steam; a vaporization chamber disposed above the plurality of fuel cell units and adjacent to the reformer, for vaporizing supplied water; a combustion chamber disposed inside the fuel cell module, that combusts fuel passed through the internal passage at the top end of each of the fuel cell units to heat the reformer and vaporization chamber above; a fuel supply device that, by supplying fuel to the reformer, feeds fuel reformed in the reformer into each of the fuel cell units; a reforming oxidant gas supply device that supplies reforming oxidant gas to the reformer; a water supply device that supplies reforming water to the vaporization chamber; a supply device of oxidant gas for electrical generation that supplies oxidant gas for electrical generation to the oxidant gas electrodes of the plurality of fuel cell units; and a controller programmed to control the fuel supply device, the supply device of oxidant gas for electrical generation, and the water supply device in a startup step of the fuel cell module to create a partial oxidation reforming reaction and a steam reforming reaction in the reformer, in order to raise the temperature of the plurality of fuel cell units to the temperature at which electrical generation is possible; wherein the controller controls the reforming oxidant gas supply device and the water supply device so that during the entire period of the startup step, the partial oxidation reforming reaction does not solely occur in the reformer.

In the present invention thus constituted, the fuel supply device and the reforming oxidant gas supply device supply fuel and reforming oxidant gas to the reformer. The water supply device supplies reforming water to the vaporization chamber disposed adjacent to the reformer. Fuel reformed in the reformer is supplied to multiple fuel cell units with which the fuel cell module is equipped. Fuel passing through the internal passages in which multiple fuel cell unit fuel electrodes are formed is combusted at the top end of each of the fuel cell units, heating the reformer and vaporization chamber above. In the fuel cell module startup step, the controller controls the fuel supply device, the reforming oxidant gas supply device, and the water supply device to cause a partial oxidation reforming reaction and a steam reforming reaction in the reformer, thereby raising the temperature of the multiple fuel cell units to one at which electrical generation is possible. Also, the controller controls the reforming oxidant gas supply device and the water supply device so that during the entire period of the startup step, no independent partial oxidation reforming reaction occurs in the reformer.

Conventionally, in off-gas combustion cell burner-type solid oxide fuel cell device in which fuel (off-gas) passing through each of the fuel cell units is combusted and the reformer is heated by this combustion heat, the temperature of the fuel cell units is raised by sequentially causing a partial oxidation reforming reaction (the POX step), an auto thermal reforming reaction (the ATR step), and a steam reforming reaction (the SR step) in the reformer. Here, the partial oxidation reforming reaction occurs at a comparatively low temperature and, because it is an exothermic reaction, is able to powerfully heat the interior of the fuel cell module. Therefore, the POX step, in which the partial oxidation reforming reaction is independently caused to occur, was considered to be an essential step at the initial stage of heating fuel cell units starting from room temperature. However, when a partial oxidation reforming reaction occurs independently in the reformer, a thermal runaway caused by sudden heating is prone to result, causing a reduction in the number of service years of the reformer due to degradation of the catalyst in the reformer. The present inventors, in addressing the technical problems unique to such off-gas combustion cell burner-type solid oxide fuel cell device, disposed a vaporization chamber for producing steam above the multiple fuel cell units and adjacent to the reformer, in order to first enable the production of steam for steam reforming at the beginning of the startup step. By so doing, they enabled the rapid raising of the vaporization chamber temperature after the commencement of the startup step.

In the present invention, by adopting such a constitution, we succeeded through appropriate control of the reforming oxidant gas supply device and the water supply device in raising the temperature inside the fuel cell module to a temperature at which electrical generation is possible, without permitting partial oxidation reforming reactions to occur independently in the reformer. This prevents thermal runaways by the reformer and solves the technical problems described above.

In the present invention, the controller only executes, as fuel reforming steps in the reformer, an ATR step and a SR step, and wherein in the ATR step, the partial oxidation reforming reaction and the steam reforming reaction occur simultaneously in the reformer, and in the SR step, only the steam reforming reaction occurs in the reformer.

In the present invention thus constituted, only the AIR step, in which the partial oxidation reforming reaction and steam reforming reaction occur simultaneously in the reformer, and the SR step, in which only the steam reforming reaction occurs in the reformer, are executed, therefore, in the reformer there is no independent occurrence of the exothermic partial oxidation reforming reaction, and degradation and damage to the reformer caused by thermal runaway of the reforming reaction can be prevented.

In the present invention, the controller controls the supply amount of reforming oxidant gas supplied from the reforming oxidant gas supply device so that the oxygen $O_2$ proportion is at all times less than the ratio $O_2/C=0.4$, wherein the ratio $O_2/C$ is a ratio between oxygen $O_2$ in the reforming oxidant gas and carbon in the fuel, at which ratio all fuel is reformed in the reformer only by the partial oxidation reforming reaction.

In the present invention thus constituted, the reforming oxidant gas supply device is controlled so that the oxygen $O_2$ proportion is at all times less than the ratio between oxygen $O_2$ in the reforming oxidant gas and carbon C in the fuel of $O_2/C=0.4$, therefore, oxygen $O_2$ is insufficient for partial oxidation reforming of the entire amount of supplied fuel, and a steam reforming reaction is always induced, thereby reliably protecting the reformer.

In the present invention, the controller executes the ATR step divided into multiple stages, and in the initial stage of the ATR step, the water supply device is controlled so that the water supply amount is smallest.

In the present invention thus constituted, the ATR step is divided into multiple stages and executed, and in the initial stage of the ATR step, the water supply amount is at a minimum, therefore, the absorption of heat by the steam reforming reaction occurring at the beginning of the startup step when the reformer temperature is low is suppressed, and the temperature of the reformer can be reliably raised.

In the present invention, the controller starts the supply of water by the water supply device before the temperature of the reformer reaches the temperature at which a partial oxidation reforming reaction occurs, so that no partial oxidation reforming reaction solely occurs within the reformer.

In the present invention thus constituted, the supplying of water by the water supply device is started before the temperature of the reformer reaches the temperature at which a partial oxidation reforming reaction occurs, therefore, water can be vaporized in advance within the vaporization chamber, and steam can be reliably supplied to the reformer when the temperature at which the partial oxidation reforming reaction occurs is reached.

In the present invention, the controller starts the supply of water by the water supply device before the temperature of the reformer reaches the temperature at which a partial oxidation reforming reaction occurs, after ignition of fuel passing through the internal passages of each of the fuel cell units.

In an off-gas combustion cell burner-type solid oxide fuel cell device, there are commonly cases in which off-gas is not ignited immediately despite lighting, and some time is required until ignition is completed. In cases where the time required for ignition is extended when the supply of water is commenced before ignition, large amounts of water accumulate in the vaporization chamber without vaporizing. When large amounts of water accumulate inside the vaporization chamber, a long time is required until water begins to vaporize, causing a delay in the supply of steam. If a large amount of accumulated water vaporizes in a short time, on the other hand, the steam reforming reaction occurs suddenly inside the reformer, and the resulting heat absorption may cause a drop in reformer temperature. In the constitution explained above, the supply of water begins after ignition, therefore, delays in the supply of steam and the sudden occurrence of a steam reforming reaction are avoided, and independently occurring partial oxidation reforming reactions and reformer temperature drops are reliably prevented.

In the present invention, the controller activates the water supply device prior to execution of the ignition step which ignites fuel passing through the internal passages in each of the fuel cell units, the controller stops the water supply device during the ignition step and the controller starts the supply of water by the water supply device after ignition.

Generally, at the beginning of the startup step, the pipe conducting water from the water supply device to the vaporization chamber is filled with air. Therefore, when supplying of water to the vaporization chamber becomes necessary, a time lag arises until water is actually supplied to vaporization chamber, even though the water supply device is activated. In the present invention thus constituted, the water supply device is activated before executing the ignition step, therefore, air in the pipe conducting water to the vaporization chamber can be purged in advance, and when the water supply device is activated after ignition, the water supply time lag can be shortened, and water can be supplied into the vaporization chamber at an appropriate time.

In the present invention, when transitioning from the ATR1 step, which is the initial stage of the ATR step, to the next stage ATR2 step, the controller increases the water supply amount while maintaining a fixed reforming oxidant gas supply amount.

In the present invention thus constituted, the reforming oxidant gas supply amount is maintained at a fixed amount when transitioning from the ATR1 step to the ATR2 step, therefore, the proportion of steam reforming is increased while maintaining the amount of carbon reformable by partial oxidation reforming, such that the risks of carbon deposition in the reformer and reformer temperature drops can be suppressed.

In the present invention, the controller maintains a fixed fuel supply amount when transitioning from the ATR1 step to the ATR2 step.

In the present invention thus constituted, a fixed fuel supply amount is maintained when transitioning from the ATR1 step to the ATR2 step, therefore, the reforming reaction can be prevented from becoming unstable when the reformer temperature is low, and the reformer temperature can be stably raised.

In the present invention, the controller is constituted to execute the ATR3 step after the ATR2 step, and to change the amount of fuel and reforming oxidant gas supplied when transitioning from the ATR2 step to the ATR3 step, while maintaining the water supply amount.

In the present invention thus constituted, the fuel supply amount and reforming oxidant gas supply amount are changed when the reformer temperature transitions from the comparatively elevated ATR2 step, therefore, the risk of destabilization of the reforming reaction can be minimized.

In the present invention, the solid oxide fuel cell device further comprises an external heat insulation material that reduces heat dissipation from the inside to the outside of the fuel cell module; a generating oxidant gas heat exchanger disposed above the vaporization chamber for exchanging heat between combustion gas produced in the combustion chamber and oxidant gas for electrical generation introduced into the fuel cell module, and preheating oxidant gas for electrical generation supplied to the plurality of fuel cell units; and a vaporization chamber temperature-raising insulation layer, disposed between the generating oxidant gas heat exchanger and the vaporization chamber, for promoting an increase in the vaporization chamber temperature by suppressing the migration of heat from the vaporization chamber to the generating oxidant gas heat exchanger.

In the present invention thus constituted, a vaporization chamber temperature-raising insulation layer is provided between the vaporization chamber and the generating oxidant gas heat exchanger for preheating oxidant gas used for electrical generation, separate from the external heat insulation material for suppressing the dissipation of heat. Because oxidant gas for electrical generation is introduced from outside to the generating oxidant gas heat exchanger, this can easily become a cooling source, but because the migration of heat from the vaporization chamber to the generating oxidant gas heat exchanger is suppressed by the vaporization chamber temperature-raising insulation layer, the vaporization chamber temperature can be caused to rise rapidly at the beginning of the startup step. In the present invention, by adopting such a constitution, we have succeeded in raising the temperature inside the fuel cell module to a temperature at which electrical generation is possible without permitting partial oxidation reforming reactions to occur independently in the reformer.

In the present invention, the thermal resistance of the vaporization chamber temperature-raising insulation layer between the vaporization chamber and the generating oxidant gas heat exchanger is less than the thermal resistance of the external heat insulation material which insulates between the interior and the exterior of the fuel cell module.

The vaporization chamber temperature-raising insulation layer is an insulating layer for suppressing the migration of heat to the generating oxidant gas heat exchanger; it is disposed inside the external heat insulation material, and has a lower thermal resistance than the external heat insulation material. In the present invention thus constituted, it is sufficient for the vaporization chamber temperature-raising insulation layer to present a thermal resistance roughly equal to what is required to raise the temperature of the vaporization chamber at the beginning of the startup step; the vaporization chamber temperature-raising insulation layer may be thinly constituted so that the fuel cell module can be made compact.

In the present invention, the vaporization chamber temperature-raising insulation layer is disposed over the entirety of the vaporization chamber.

In the present invention thus constituted, the top of the vaporization chamber is essentially covered in its entirety, therefore, migration of heat to the generating oxidant gas heat exchanger can be effectively suppressed.

In the present invention, the vaporization chamber temperature-raising insulation layer is constituted by a vaporization chamber insulating material disposed between the generating oxidant gas heat exchanger and the vaporization chamber, or by a gas retaining space provided between the generating oxidant gas heat exchanger and the vaporization chamber.

In the present invention thus constituted, the vaporization chamber temperature-raising insulation layer is constituted by either a vaporization chamber insulating material or a gas-retaining space, therefore, the insulating layer can be constituted by a simple structure.

In the present invention, the solid oxide fuel cell device further comprises an exhaust pathway disposed between the reforming section/vaporization chamber and the vaporization chamber temperature-raising insulation layer, and wherein the exhaust pathway guides combustion gas produced in the combustion chamber to the generating oxidant gas heat exchanger.

In the present invention thus constituted, an exhaust path is disposed between the reforming section/vaporization chamber and the vaporization chamber temperature-raising insulation layer, therefore, a portion of the exhaust path also acts as an insulating layer between the vaporization chamber and the generating oxidant gas heat exchanger, and can further raise the insulating effect.

In the solid oxide fuel cell device of the present invention, the number of years of usable life of a reformer can be extended, or damage to the reformer prevented, by causing the temperature inside the reformer to rise rapidly while suppressing thermal runaway.

BRIEF DESCRIPTION OF THE DRAWINGS

FIG. 13 is a table showing the supply amounts of reforming air, water, and generating air at each stage in the startup step in a solid oxide fuel cell device according to an embodiment of the present invention.

DETAILED DESCRIPTION OF THE PREFERRED EMBODIMENTS

Next, referring to the attached drawings, we discuss a solid oxide fuel cell device (SOFC) according to an embodiment of the present invention.

Figure 1:
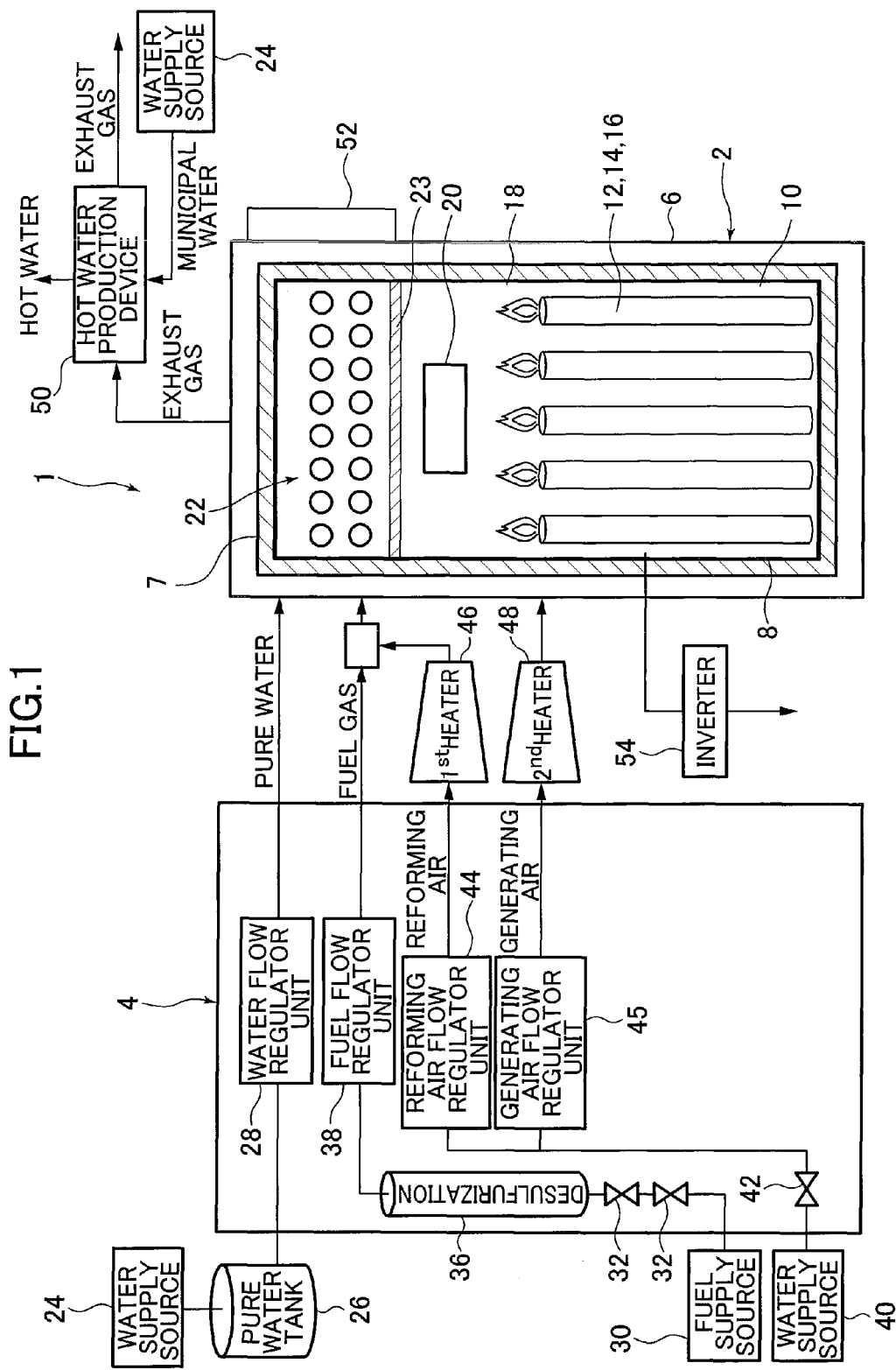
FIG. 1 is an overview diagram showing a solid oxide fuel cell device according to an embodiment of the present invention.

FIG. 1 is an overview diagram showing a solid oxide fuel cell device (SOFC) according to an embodiment of the present invention. As shown in FIG. 1, the solid oxide fuel cell device (SOFC) of this embodiment of the present invention is furnished with a fuel cell module 2 and an auxiliary unit 4.

Fuel cell module 2 is furnished with a housing 6; within this housing 6 is housed a case 8 forming a sealed space surrounded by heat insulation 7, which is external heat insulation material. A fuel cell assembly 12 for carrying out an electrical generation reaction using fuel and oxidant (air) is disposed in generating chamber 10, which is the lower part of the interior of case 8. This fuel cell assembly 12 is furnished with 10 fuel cell stacks 14 (see FIG. 5), and fuel cell stack 14 comprises 16 fuel cell units 16 (see FIG. 4). Thus, fuel cell assembly 12 has 160 fuel cell units 16, all of which are serially connected.

A combustion chamber 18 is formed at the top of the above-described generating chamber 10 inside case 8 in fuel cell module 2; residual fuel and residual oxidant (air) not used for the electrical generation reaction are combusted in this combustion chamber 18, producing exhaust gas.

Disposed at the top of combustion chamber 18 is a reformer 20 for reforming fuel; this heats reformer 20 to a temperature at which the reforming reaction is possible using combustion heat from the residual gas. Furthermore, an air heat exchanger 22 is disposed on the top of this reformer 20 for receiving heat from the reformer 20 and heating air so as to restrain temperature drops in the reformer 20.

Next, auxiliary unit 4 is furnished with a pure water tank 26 for holding water from a municipal or other water supply source 24 and filtering it into pure water, and a water flow regulator unit 28 (a "water pump" or the like driven by a motor) for regulating the flow volume of water supplied from the reservoir tank. Auxiliary unit 4 is furnished with a gas shutoff valve 32 for shutting off gas supplied from a municipal gas or other fuel supply source 30, a desulfurizer 36 for removing sulfur from fuel gas, and a fuel flow regulator unit 38 (a motor-driven "fuel pump" or the like) for regulating the flow volume of fuel gas. Furthermore, an auxiliary unit 4 is furnished with an electromagnetic valve 42 for shutting off air serving as oxidizer and supplied from an air supply source 40, a reforming air flow regulator unit 44 and generating air flow regulator unit 45 ("air blower" or the like driven by a motor) for regulating air flow volume, a first heater 46 for heating reforming air supplied to the reformer 20, and a second heater 48 for heating generating air supplied to the generating chamber. This first heater 46 and second heater 48 are provided in order to efficiently raise the temperature at startup, but may be omitted.

Next, a hot-water producing device 50 supplied with exhaust gas is connected to fuel cell module 2. Tap water from a water supply source 24 is supplied to this hot-water producing device 50; this tap water is turned into hot water by the heat of the exhaust gas, and is supplied to a hot water reservoir tank in an external water heater, not shown.

A control box 52 for controlling the amount of fuel gas supplied, etc., is connected to fuel cell module 2.

Furthermore, an inverter 54 serving as an electrical power extraction unit (electrical power conversion unit) for supplying electrical power generated by the fuel cell module to the outside is connected to fuel cell module 2.

Figure 2:
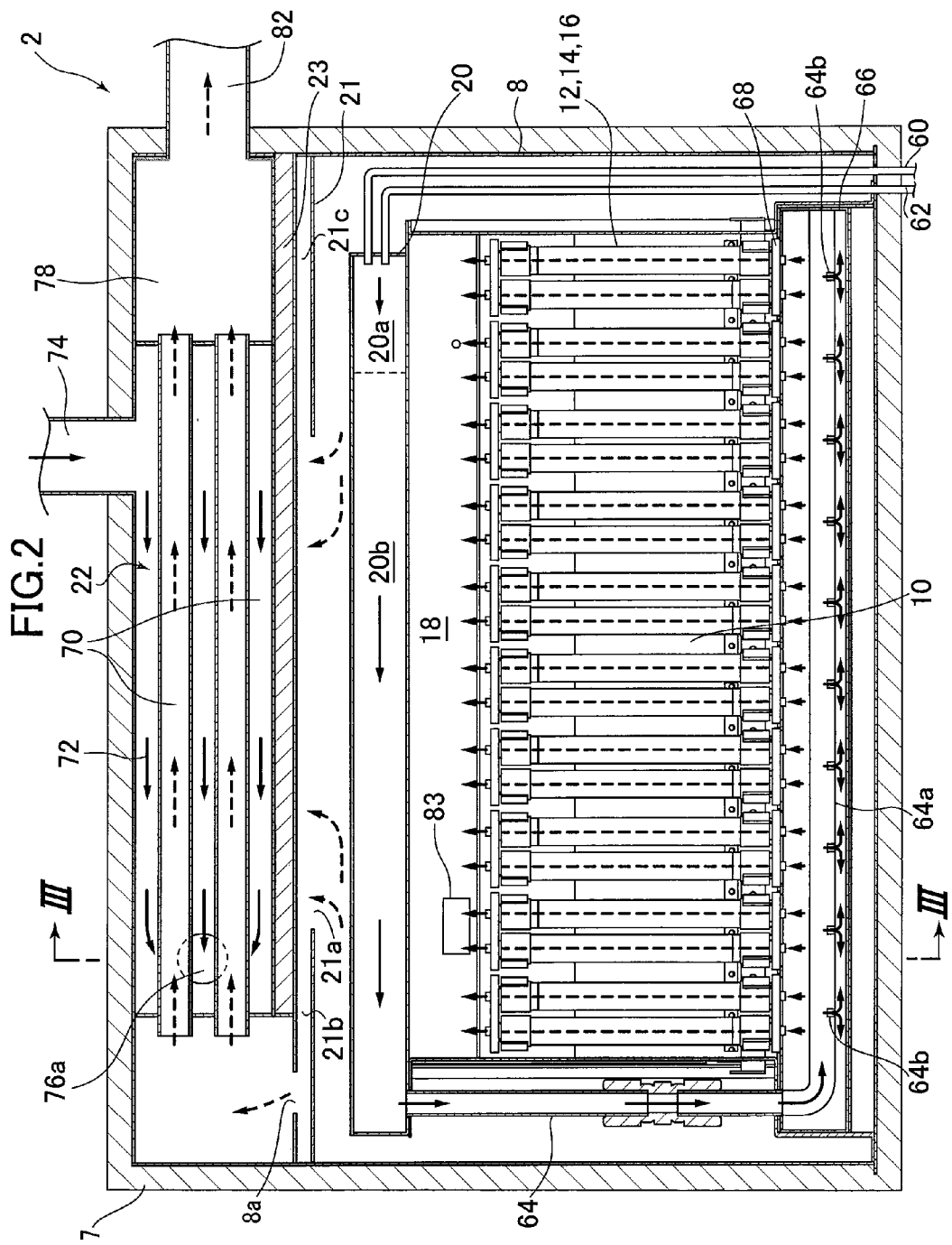
FIG. 2 is a front elevation cross section showing the fuel cell module of a fuel cell device according to an embodiment of the present invention.
Figure 3:
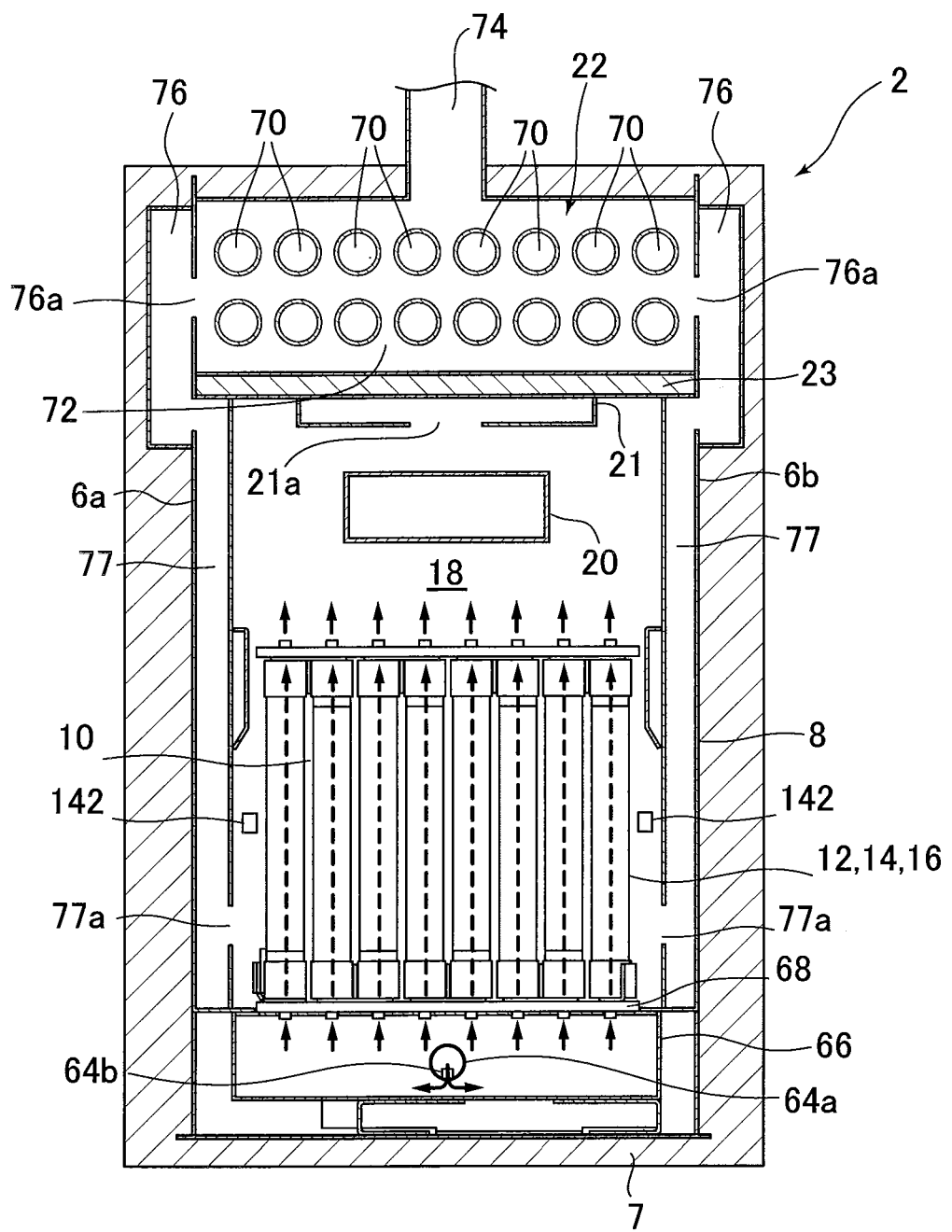
FIG. 3 is a sectional diagram along line III-III in FIG. 2.

The internal structure of the solid oxide fuel cell device (SOFC) fuel cell module of this embodiment of the present invention is explained using FIGS. 2 and 3. FIG. 2 is a side elevation sectional diagram showing a fuel cell module in a solid oxide fuel cell device (SOFC) according to an embodiment of the present invention; FIG. 3 is a sectional diagram along line of FIG. 2.

As shown in FIGS. 2 and 3, fuel cell assembly 12, reformer 20, and air heat exchanger 22 are disposed as described above in sequence starting from the bottom in case 8, which is sealed within housing 6 of fuel cell module 2.

A pure water guide pipe 60 for introducing pure water on the upstream end of reformer 20, and a reformed gas guide pipe 62 for introducing the fuel gas and reforming air to be reformed, are attached to reformer 20; vaporizing section 20a and a reforming section 20b are formed in sequence starting from the upstream side within reformer 20, and this vaporizing section 20a and reforming section 20b are filled with a reforming catalyst. Fuel gas and air blended with the steam (pure water) introduced into reformer 20 is reformed by the reforming catalyst used to fill in reformer 20. Appropriate reforming catalysts are used, such as those in which nickel is added to the surface of aluminum spheres, or ruthenium is added to the surface of aluminum spheres.

A fuel gas supply line 64 is connected to the downstream end of reformer 20; this fuel gas supply line 64 extends downward, then further extends horizontally within a manifold formed under fuel cell assembly 12. Multiple fuel supply holes 64b are formed on the bottom surface of a horizontal portion 64a of fuel gas supply line 64; reformed fuel gas is supplied into manifold 66 from these fuel supply holes 64b.

A lower support plate 68 provided with through holes for supporting the above-described fuel cell stack 14 is attached at the top of manifold 66, and fuel gas in manifold 66 is supplied into fuel cell units 16.

Next, an air heat exchanger 22 is provided over reformer 20.

Also, as shown in FIG. 2, an ignition device 83 for starting the combustion of fuel gas and air is provided in combustion chamber 18.

Figure 4:
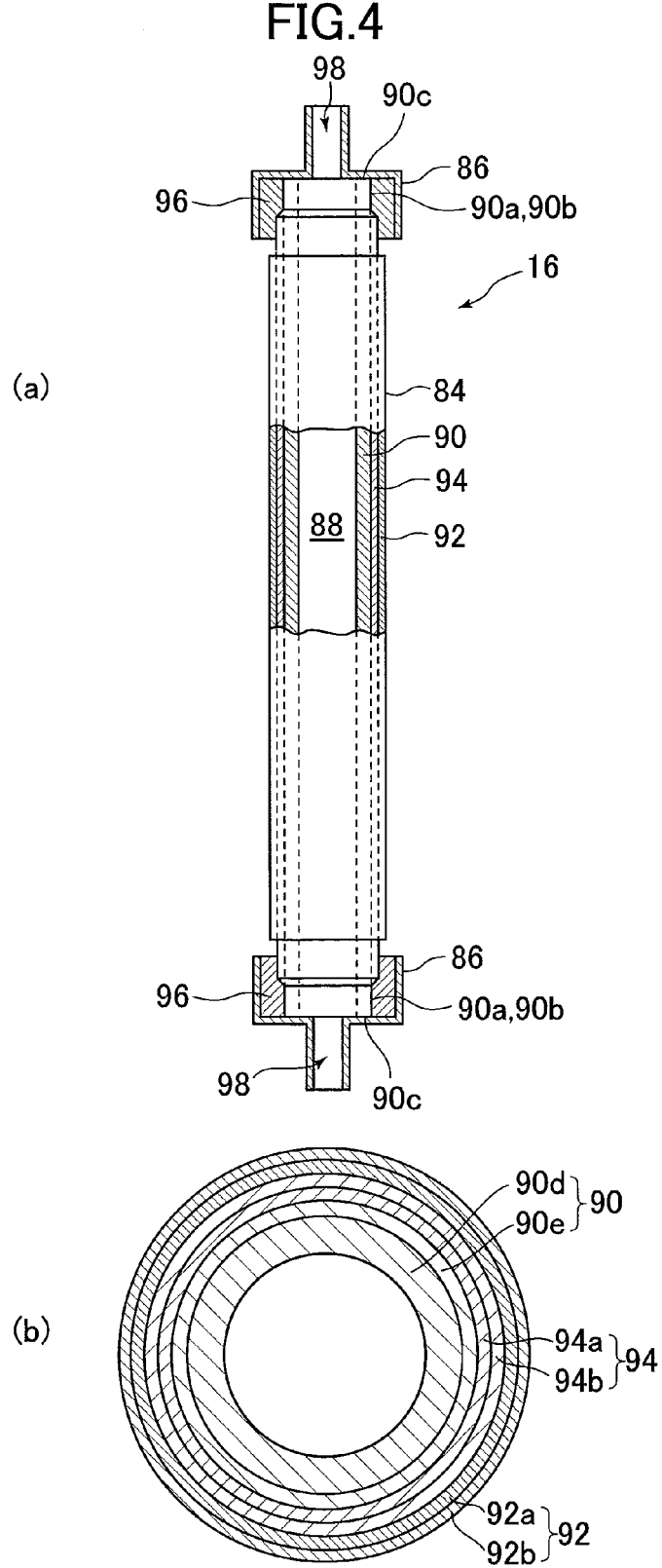
FIG. 4(a) is a partial section and (b) is a cross section showing an individual fuel cell unit in a fuel cell device according to an embodiment of the present invention.

Next, referring to FIG. 4, we discuss fuel cell units 16. FIG. 4(a) is a partial section showing a solid oxide fuel cell device (SOFC) fuel cell unit according to an embodiment of the present invention. FIG. 4(b) is a cross section of a fuel cell unit.

As shown in FIG. 4(a), fuel cell units 16 are furnished with a fuel cell 84 and internal electrode terminals 86, respectively connected to the respective terminals at the top and bottom of fuel cell 84.

Fuel cell 84 is a tubular structural body extending in the vertical direction, furnished internally with an inside electrode layer 90 forming a fuel gas flow path 88 which is an internal passage, a cylindrical outside electrode layer 92, and an electrolyte layer 94 between inside electrode layer 90 and outside electrode layer 92. This internal electrode layer 90 is a fuel electrode through which fuel gas passes, and is a (−) pole, while the external electrode layer 92 is an air electrode which contacts the air, and is a (+) pole.

The internal electrode terminals 86 attached at the top end and bottom end of fuel cell units 16 have the same structure, therefore, we will here discuss specifically the internal electrode terminal 86 attached at the top and side. The top portion 90a of inside electrode layer 90 is furnished with an outside perimeter surface 90b and top end surface 90c, exposed to electrolyte layer 94 and outside electrode layer 92. Inside electrode terminal 86 is connected to the outer perimeter surface of inside electrode layer 90 through a conductive seal material 96, and is electrically connected to inside electrode layer 19 by making direct contact with the top end surface 90c of inside electrode layer 90. A fuel gas flow path 98 communicating with the inside electrode layer 90 fuel gas flow path 88 is formed at the center portion of inside electrode terminal 86.

Inside electrode layer 90 can be formed, for example, from at least one of a mixture of NiO and zirconia doped with at least one type of rare earth element selected from among NiO, Ca, Y, Sc, or the like; or a mixture of NiO and ceria doped with at least one type of rare earth element; or any mixture of NiO with lanthanum gallate doped with at least one element selected from among Sr, Mg, Co, Fe, or Cu.

The electrolyte layer 94 can be formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 can be formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Next, referring to FIG. 4(b), we discuss details of the structure of fuel cell device 84.

As shown in FIG. 4(b), inside electrode layer 90 comprises a first fuel electrode 90d and a second fuel electrode 90e. Electrolyte layer 94 comprises a first electrolyte 94a and a second electrolyte 94b; outside electrode layer 92 comprises an air electrode 92a and a collector layer 92b.

In the present embodiment first fuel electrode 90d is formed by ignition of a mixture of NiO with YSZ, which is Y-doped zirconium. Second fuel electrode 90e is formed by forming a film of a mixture of NiO and GDC, which is Gd-doped ceria, on the outside of first fuel electrode 90d.

Also, in the present embodiment first electrolyte 94a is formed by laminating LDC40, which is lanthanum-doped ceria, onto the outside of second fuel electrode 90e. In addition, second electrolyte 94b is formed by laminating LSGM, which is Sr- and Mg-doped lanthanum gallate, onto the outside of first electrolyte 94*a*. A fired body is obtained by firing bodies formed as described above.

In the present embodiment, air electrode 92*a* is formed by forming a film of LSCF, which is Sr- and Fe-doped lanthanum cobaltite, on the outside of this fired body. Collector layer 92*b* is constituted by forming an Ag layer on the outside of air electrode 92*a*.

Figure 5:
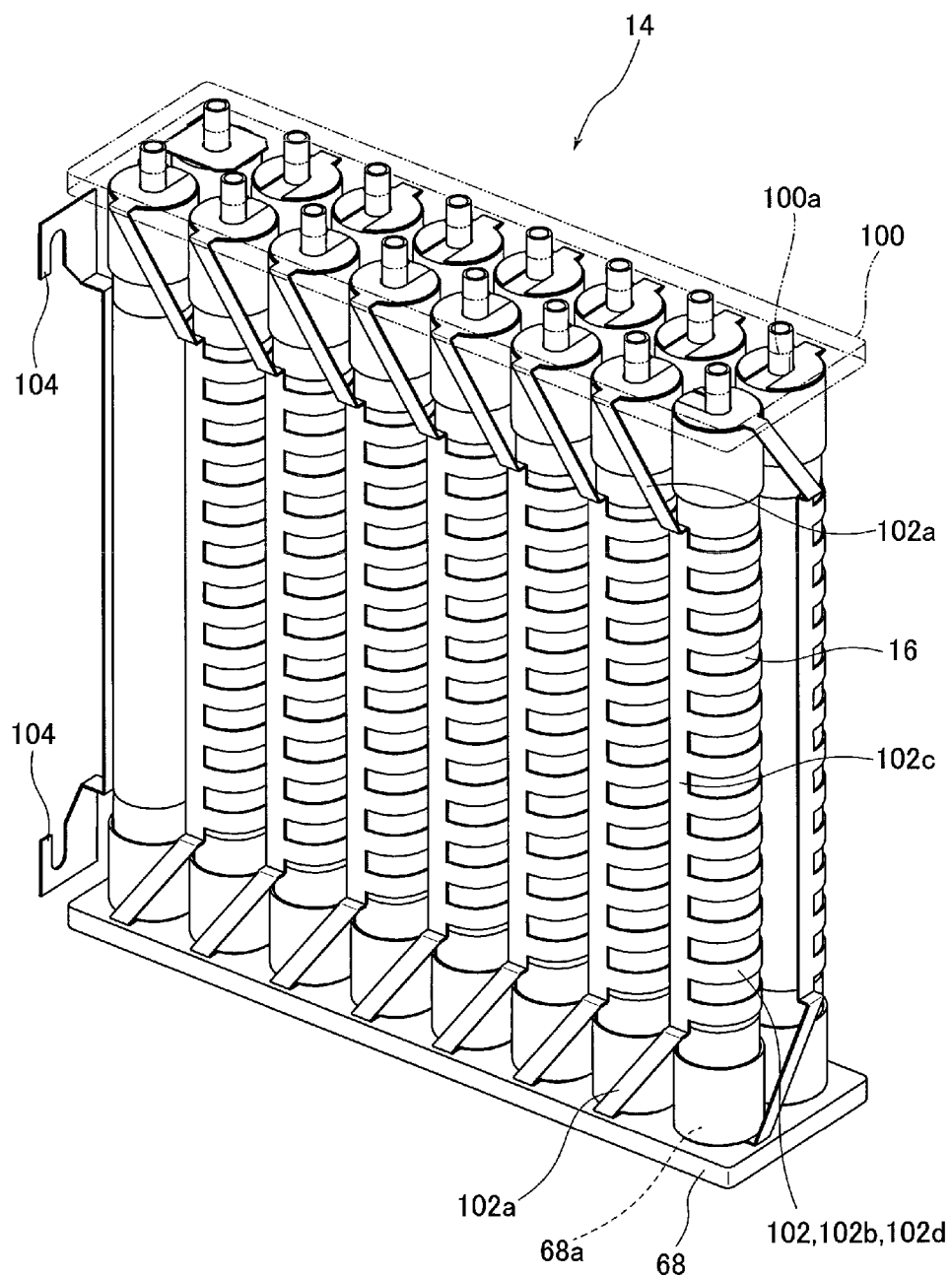
FIG. 5 is a perspective view showing a fuel cell stack in a fuel cell device according to an embodiment of the present invention.

Next, referring to FIG. 5, we discuss fuel cell stack 14. FIG. 5 is a perspective view showing the fuel cell stack in a solid oxide fuel cell device (SOFC) according to an embodiment of the present invention.

As shown in FIG. 5, fuel cell stack 14 is furnished with sixteen fuel cell units 16; the top inside and bottom inside of these fuel cell units 16 are respectively supported by a lower support plate 68 and an upper support plate 100. Through holes 68*a* and 100*a*, through which the inside electrode terminal 86 can penetrate, are provided on this lower support plate 68 and outer support plate 100.

In addition, a collector 102 and an external terminal 104 are attached to fuel cell units 16. This collector 102 is integrally formed by a fuel electrode connecting portion 102*a*, which is electrically connected to inside electrode terminal 86 attached to inside electrode layer 90 serving as the fuel electrode, and by an air electrode connecting portion 102*b*, which is electrically connected to the entire external perimeter of outside electrode layer 92 serving as the air electrode. The air electrode connecting portion 102*b* is formed of a vertical portion 102*c* extending vertically along the surface of outside electrode layer 92, and multiple horizontal portions 102*d* extending in the horizontal direction from this vertical portion 102*c* along the surface of outside electrode layer 92. Fuel electrode connecting portion 102*a* extends linearly in an upward or downward diagonal direction from the vertical portion 102*c* of air electrode connecting portion 102*b* toward inside electrode terminals 86 positioned in the upper and lower directions on fuel cell units 16.

Furthermore, electrode terminals 86 at the top and bottom ends of the two fuel cell units 16 positioned at the end of fuel cell stack 14 (at the front and back sides on the left edge in FIG. 5) are respectively connected to outside terminals 104. These external terminals 104 are connected to external terminals 104 (not shown) at the ends of adjacent fuel cell stack 14, and as described above, all of the 160 fuel cell units 16 are connected in series.

Figure 6:
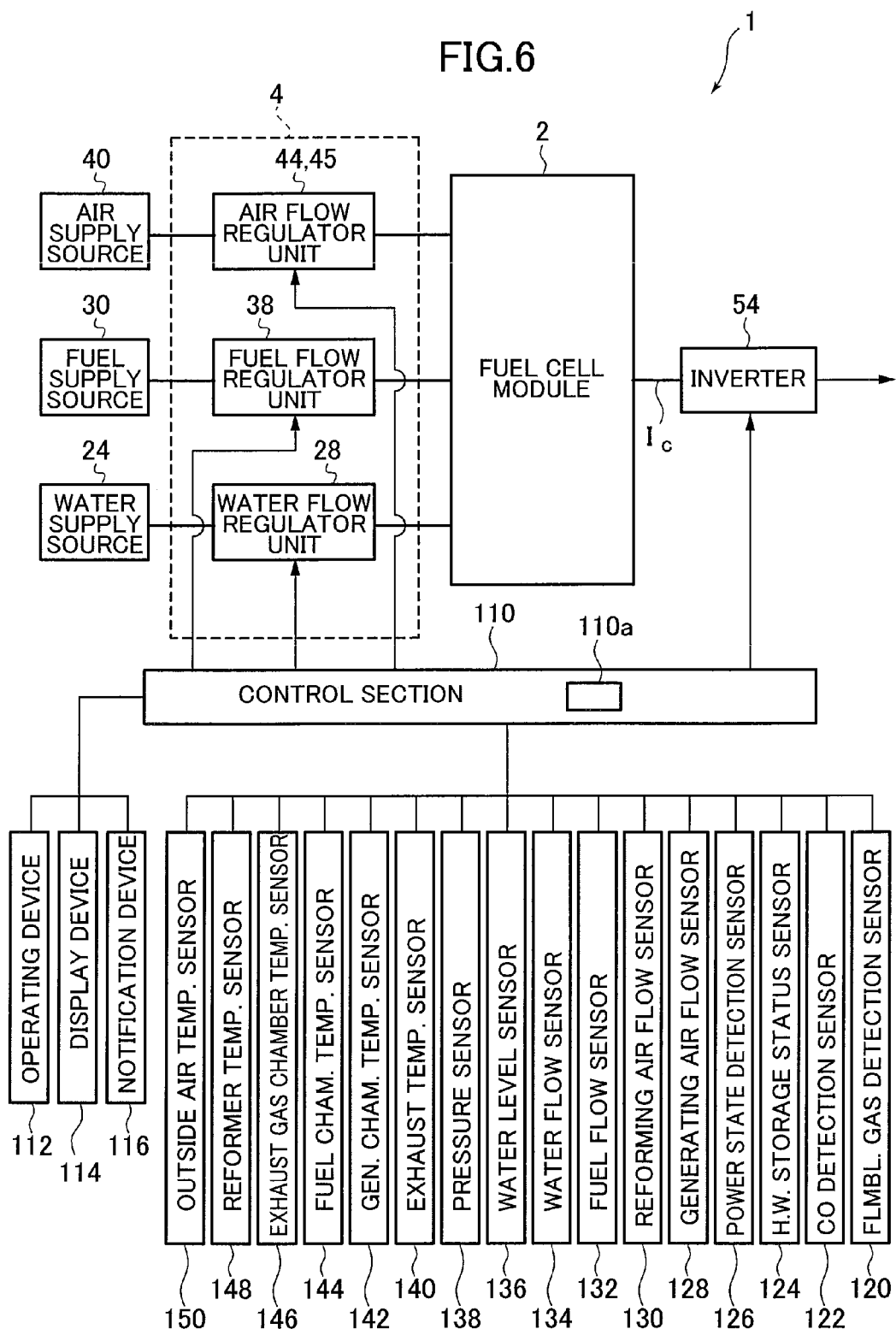
FIG. 6 is a block diagram showing a fuel cell device according to an embodiment of the present invention.

Next, referring to FIG. 6, we discuss the sensors attached to the solid oxide fuel cell device (SOFC) according to the present embodiment. FIG. 6 is a block diagram showing a solid oxide fuel cell device (SOFC) according to an embodiment of the present invention.

As shown in FIG. 6, a solid oxide fuel cell device 1 is furnished with a control unit 110; connected to this control section 110 are: an operating device 112 provided with operating buttons such as "ON" or "OFF" for user operation, a display device 114 for displaying various data such as a generator output value (Watts), and a notification device 116 for issuing warnings during abnormal states and the like. This notification device 116 may also be connected to a remote control center to inform this control center of abnormal states.

Next, signals from the various sensors described below are input to control unit 110.

First, flammable gas detection sensor 120 is for detecting gas leaks; it is attached to fuel cell module 2 and auxiliary unit 4.

The purpose of flammable gas detection sensor 120 is to detect whether CO in the exhaust gas, which is supposed to be discharged to the outside via exhaust gas conduit 80, has leaked into the external housing (not shown) which covers fuel cell module 2 and auxiliary unit 4.

A water reservoir state detection sensor 124 detects the temperature and amount of hot water in a water heater (not shown).

An electrical power state detection sensor 126 detects current, voltage, and the like in inverter 54 and in a distribution panel (not shown).

A generator air flow detection sensor 128 detects the flow volume of generating air supplied to generating chamber 10.

A reforming air flow volume sensor 130 detects the volume of reforming air flow supplied to reformer 20.

A fuel flow volume sensor 132 detects the flow volume of fuel gas supplied to reformer 20.

A water flow volume sensor 134 detects the flow volume of pure water supplied to reformer 20. A water level sensor 136 detects the water level in pure water tank 26. A pressure sensor 138 detects pressure on the upstream side outside reformer 20.

An exhaust temperature sensor 140 detects the temperature of exhaust gas flowing into hot water producing device 50.

As shown in FIG. 3, a generating chamber temperature sensor 142 is disposed on the front surface side and rear surface side around fuel cell assembly 12 with the purpose of detecting the temperature near fuel cell stack 14 and estimating the temperature of fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in exhaust gas chamber 78.

A reformer temperature sensor 148 detects the temperature of reformer 20 and calculates the reformer 20 temperature from the intake and exit temperatures on reformer 20.

If the solid oxide fuel cell device (SOFC) is placed outdoors, outside temperature sensor 150 detects the temperature of the outside atmosphere. Sensors to detect outside atmospheric humidity and the like may also be provided.

Signals from these various sensor types are sent to control unit 110; control unit 110 sends control signals to water flow regulator unit 28, fuel flow regulator unit 38, reforming air flow regulator unit 44, and generating air flow regulator unit 45 based on data from the sensors, and controls the flow volumes in each of these units.

Figure 7:
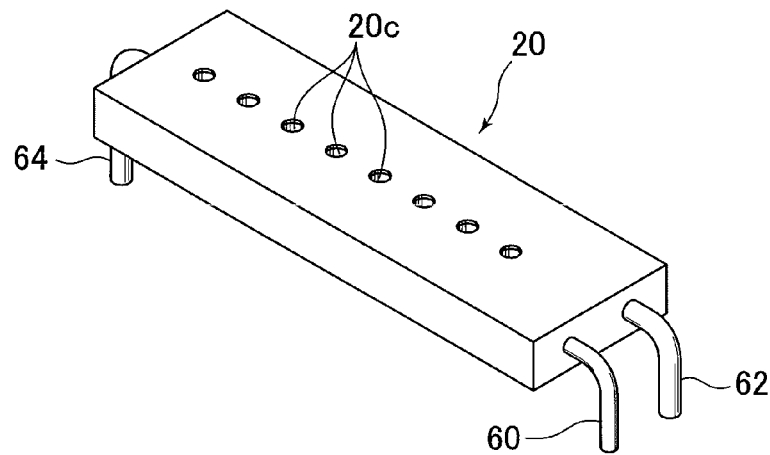
FIG. 7 is a perspective view of a fuel cell device reformer according to an embodiment of the present invention.
Figure 8:
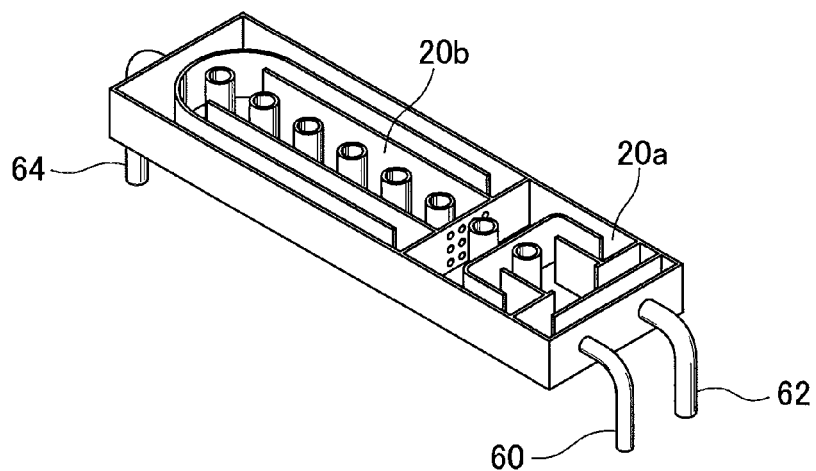
FIG. 8 is a perspective view showing the interior of a reformer with the top plate removed, in a fuel cell device according to an embodiment of the present invention.
Figure 9:
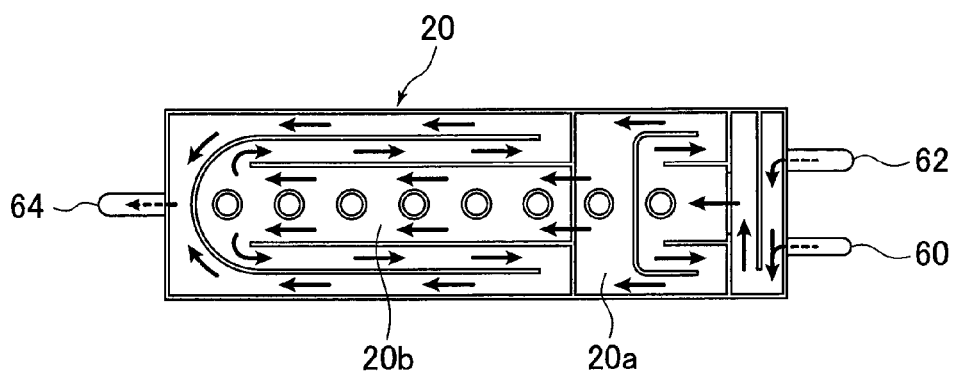
FIG. 9 is a plan view section showing the flow of fuel inside a reformer, in a fuel cell device according to an embodiment of the present invention.

Next, referring to FIGS. 7 through 9, we discuss the detailed constitution of reformer 20.

FIG. 7 is a perspective view of reformer 20; FIG. 8 is a perspective view showing the interior of reformer 20 with the top plate removed. FIG. 9 is a plan view sectional diagram showing the flow of fuel inside reformer 20.

As shown in FIG. 7, reformer 20 is a rectangular parallelepiped metal box filled internally with a reforming catalyst for reforming fuel. Connected on the upstream side of reformer 20 is a pure water introducing pipe 60 for introducing water, and a reformed gas introducing pipe 62 for introducing fuel and reforming air. In addition, on the downstream side of reformer 20, a fuel gas supply pipe 64 is connected for discharging fuel reformed in the interior of reformer 20. There are also 8 air passage openings 20*c* placed in the longitudinal direction on reformer 20. These air passage openings 20*c* are placed so as to penetrate from the bottom surface to the top surface of reformer 20 in such a way that combustion gas combusted in combustion chamber 18 (FIG. 2) at the bottom of reformer 20 will be smoothly removed from the top of reformer 20; air passage openings 20c do not communicate with the interior of reformer 20.

As shown in FIG. 8, vaporizing section 20a, which is a vaporization chamber, is placed on the upstream side of the interior of reformer 20, and a reformer section 20b is placed adjacent to this vaporizing section 20a on the downstream side. A winding passageway is formed within steam generating section by the disposition of multiple partitioning plates. Water introduced into reformer 20 is vaporized at an elevated temperature inside vaporizing section 20a and becomes steam. Fuel gas and reforming air introduced into reformer 20 is mixed with steam as it passes through the winding pathway of the steam producing section.

At the same time, a winding passageway is also formed inside reformer section 20b by the disposition of multiple partitioning plates, and this passageway is filled with catalyst. Fuel gas and reforming air blended in the vaporizing section 20a are subjected to the partial oxidation reforming reaction as they pass through the passageway in reformer section 20b. When a mixture of fuel gas, steam, and reforming air are introduced from vaporizing section 20a, a partial oxidation reforming reaction and a steam reforming reaction occur in reformer section 20b. Furthermore, when a mixture of fuel gas and steam are introduced from vaporizing section 20a, only the steam reforming reaction occurs in reformer section 20b.

Note, that in the present embodiment the vaporizing section 20a and the reformer are constituted as a single unit, and a single reformer is formed, but it is also possible as a variant example to provide a reformer furnished with only a reformer section, and to a provide a vaporization chamber adjacent thereto on the upstream side.

As shown in FIG. 9, fuel gas, water, and reforming air introduced into reformer 20 vaporizing section 20a at first flows sinuously in a direction crossing reformer 20, then is branched into two paths to wind in the longitudinal direction of reformer 20. Furthermore, the passageways once again merge and are connected to the reformer section 20b at the center part of reformer 20. After flowing longitudinally in the center of reformer 20, fuel and the like introduced into reformer section 20b are branched into two parts and returned; the two passageways are again returned and directed toward the downstream end of reformer section 20b, where they are merged to flow into fuel gas supply pipe 64. As it passes through the passageway, winding in the manner described, fuel is reformed by the catalyst with which the passageway is filled.

Figure 10:
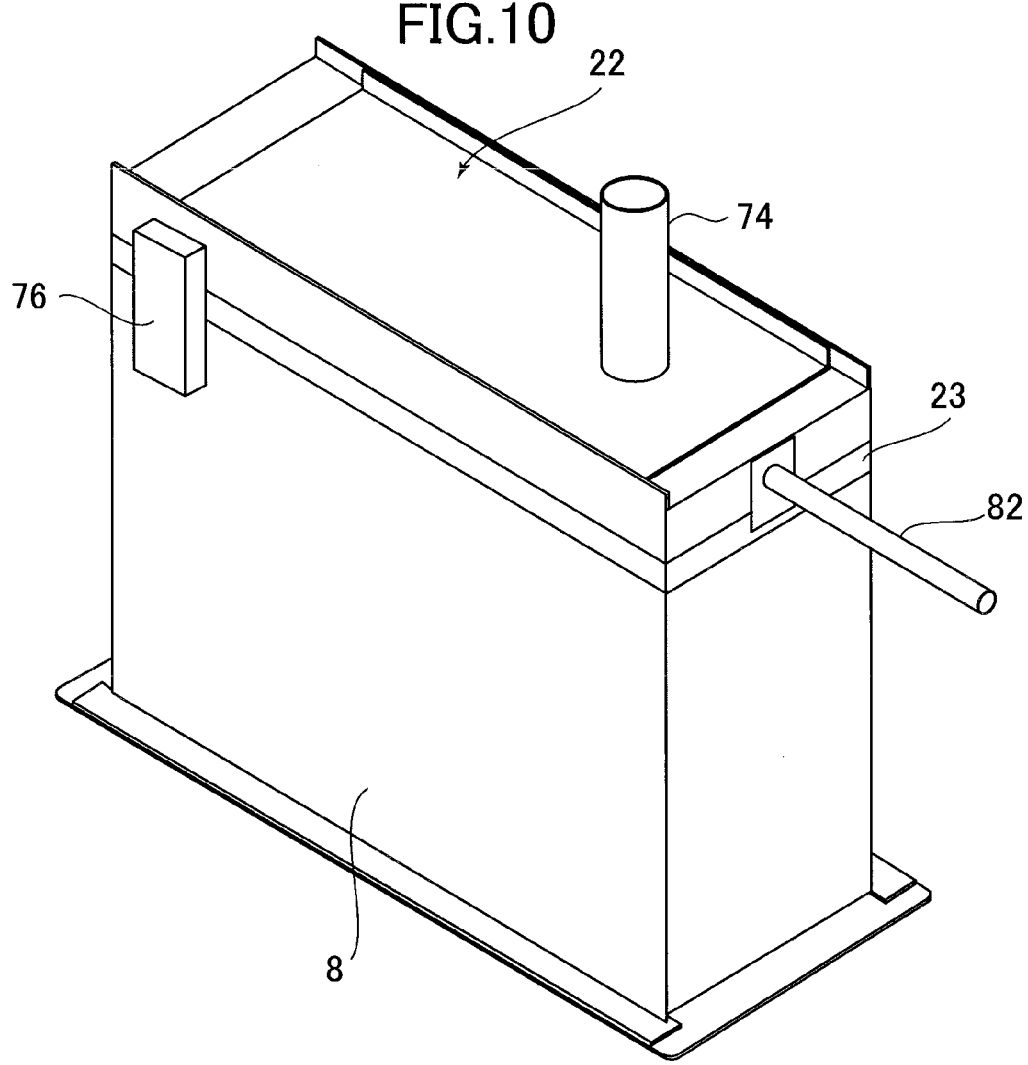
FIG. 10 is a perspective view showing a metal case and an air heat exchanger housed within a housing, in a fuel cell device according to an embodiment of the present invention.
Figure 11:
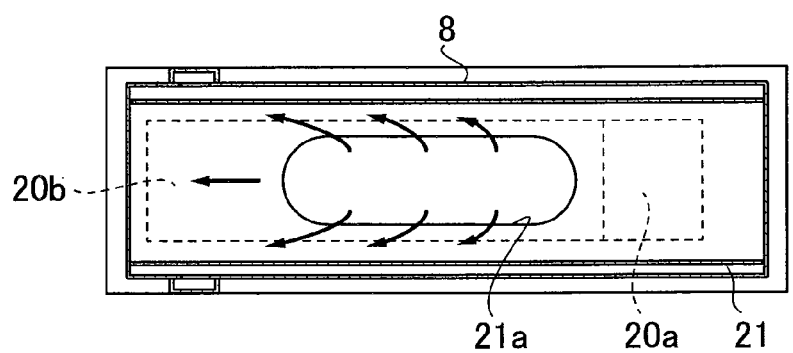
FIG. 11 is a sectional diagram showing the positional relationship between heat insulation in a heat exchanger and the vaporizing section, in a fuel cell device according to an embodiment of the present invention.

Next, newly referring to FIGS. 10 and 11 and again referring to FIGS. 2 and 3, we discuss air heat exchanger 22, which is a heat exchanger for electrical generation oxidant gas. FIG. 10 is a perspective view showing a metal case 8 and an air heat exchanger 22 housed within a housing 6, in a fuel cell device according to an embodiment of the present invention. FIG. 11 is a sectional diagram showing the relationship between an insulating material for heat exchanging, and the position of the vaporizing section 20a.

As shown in FIG. 10, air heat exchanger 22 is a heat exchanger disposed above case 8 in fuel cell module 2. Also, as shown in FIGS. 2 and 3, combustion chamber 18 is formed within case 8, and multiple individual fuel cell units 16, reformer 20, and the like are housed therein, therefore, air heat exchanger 22 is positioned above these. Air heat exchanger 22 is constituted so that the heat of combustion gas combusted in combustion chamber 18 and discharged as exhaust is recovered and utilized, pre-heating generating air introduced into fuel cell module 2. Also, as shown in FIG. 10, vaporization chamber insulating material 23 is disposed so as to be sandwiched between the top surface of case 8 and the bottom surface of air heat exchanger 22. Furthermore, heat insulation 7, which is an external heat insulation material, covers (FIG. 2) the outer side of air heat exchanger 22 and case 8 shown in FIG. 10.

As shown in FIGS. 2 and 3, air heat exchanger 22 has multiple combustion gas pipes 70 and generating air flow paths 72. In addition, as shown in FIG. 2, an exhaust gas collection chamber 78 is provided at one end of the multiple combustion gas pipes 70; this exhaust gas collection chamber 78 communicates with each of the combustion gas pipes 70. An exhaust gas discharge pipe 82 is connected to exhaust gas collection chamber 78. Furthermore, the other end portion of each of the combustion gas pipes 70 is open, and these open end portions are placed in communication with combustion chamber 18 inside case 8 via communication opening 8a formed on the top surface of case 8.

The combustion gas pipes 70 are multiple round metal pipes oriented horizontally, each of which is disposed in parallel. Generating air flow path 72, on the other hand, is comprised of the spaces outside each of the combustion gas pipes 70. A generating air introducing pipe 74 is connected above one end portion of generating air flow path 72, and air outside fuel cell module 2 is directed to generating air flow path 72 via generating air introducing pipe 74. Moreover, a pair of communication paths 76 is connected to the two side surfaces of the other end portion of generating air flow path 72 (FIGS. 3, 10), and generating air flow path 72 is respectively linked to each of the communication paths 76 via outlet port 76a.

As shown in FIG. 3, generating air supply paths 77 are respectively placed on both side surfaces of case 8. Each of the communication paths 76 disposed on the two side surfaces of air heat exchanger 22 communicates with the top portion of generating air supply paths 77, which are provided on the two side surfaces of case 8. Multiple jet outlets 77a are arrayed horizontally at the bottom portion of each generating air supply path 77. Generating air supplied through generating air supply paths 77 is injected from jet outlets 77a toward the lower portion side surface of fuel cell stack 14 in fuel cell module 2.

Attached to the ceiling surface inside case 8 is a flow straightening plate 21, which is a partition; an opening portion 21a is disposed on this flow straightening plate 21. The flow straightening plate 21 is a plate material horizontally disposed between the ceiling surface of case 8 and reformer 20. This flow straightening plate 21 straightens the flow of gas flowing from combustion chamber 18 upward, guiding it to the intake port (communication opening 8a) of air heat exchanger 22. Generating air and combustion gas directed from combustion chamber 18 upward flows through the opening portion 21a provided at the center of flow straightening plate 21 to the upper side of flow straightening plate 21, then flows in a leftward direction as seen in FIG. 2 in exhaust pathway 21b between the top surface of flow straightening plate 21 and the ceiling surface of case 8. As shown in FIG. 11, opening portion 21a is placed at the top of reformer 20 reformer section 20b; gas rising through opening portion 21a flows to the exhaust pathway 21b at the left side in FIGS. 2 and 11, on the opposite side of vaporizing section 20a. Therefore, the space at the top of 2ax (on the right side in FIGS. 2 and 11) acts as a gas holding space 21c with a slower exhaust flow rate than the space at the top of reformer section 20b.

Vaporization chamber insulating material 23 is insulation attached to the bottom surface of air heat exchanger 22 so as to cover essentially the entirety thereof. Therefore, vaporization chamber insulation 23 is disposed over the entirety of vaporizing section 20a. This vaporization chamber insulation 23 is disposed so that the high temperature gas inside exhaust pathway 21b and gas holding space 21c formed between the top surface of flow straightening plate 21 and the ceiling surface of case 8 is constrained from directly heating the bottom surface of air heat exchanger 22. There is, therefore, a tendency for heat directly transferred from the exhaust held in the exhaust pathway at the top of vaporizing section 20a to the bottom surface of air heat exchanger 22 to decline, and for the temperature around vaporizing section 20a to rise.

Note, that in order to constrain dissipation of heat to the outside, vaporization chamber insulation 23 is insulation disposed within heat insulation 7, separate from the heat insulation 7 serving as external heat insulation material, which covers the entirety of case 8 and air heat exchanger 22 in fuel cell module 2. Also, heat insulation 7 has higher heat insulating characteristics than vaporization chamber insulation 23. That is, the thermal resistance between the inside and outside surfaces of heat insulation 7 is greater than the thermal resistance between the top surface and bottom surface of vaporization chamber insulation 23. In other words, if heat insulation 7 and vaporization chamber insulation 23 are comprised of the same material, heat insulation 7 will be thicker than vaporization chamber insulation 23.

Next, we discuss the flow of fuel, generating air, and exhaust gas during an electrical generation operation of solid oxide fuel cell device 1.

First, fuel is introduced into the vaporizing section 20a of reformer 20 through reformed gas introducing pipe 62, and pure water is introduced into vaporizing section 20a via pure water introducing pipe 60. During generating operation, because the vaporizing section 20a is heated to a high temperature, pure water introduced into the vaporizing section 20a is vaporized comparatively rapidly to become steam. Vaporized steam and fuel are mixed inside the vaporizing section 20a and flow into reformer 20 reformer section 20b. Fuel introduced together with steam into reformer section 20b is here steam reformed, and reformed into a fuel gas rich in hydrogen. Fuel reformed in reformer section 20b falls downward through fuel gas supply pipe 64 and into manifold 66, which is a dispersion chamber.

Manifold 66 is a rectangular parallelepiped space with a relatively large volume disposed on the bottom side of fuel cell stack 14; multiple holes on the top surface thereof communicate with the inside of each of the individual fuel cell units 16 which make up fuel cell stack 14. Fuel introduced into manifold 66 passes through the multiple holes on the top surface thereof, then passes through the fuel electrode side of individual fuel cell units 16, which is to say the interior of individual fuel cell units 16, and flows out of the top end thereof. When hydrogen gas fuel passes through the interior of individual fuel cell units 16, it reacts with oxygen in the air passing through the outside of the individual fuel cell units 16, which is an air electrode (oxidant gas electrode), and an electrical charge is produced. Residual fuel not used for this electrical generation flows out from the top end of each individual fuel cell unit 16 and is combusted in the combustion chamber 18 placed over fuel cell stack 14.

Meanwhile, generating air, which is oxidant gas, is fed into fuel cell module 2 through generating air introducing pipe 74 by generating air flow regulator unit 45, which is a device for supplying oxidant gas for electrical generation. Air fed into fuel cell module 2 is introduced into generating air flow path 72 in air heat exchanger 22 through generating air introducing pipe 74 and preheated. Preheated air flows out to communication paths 76 via each of the outlet ports 76a (FIG. 3). Generating air which has flowed into each communication path 76 flows downward through generating air supply paths 77 provided on both side surfaces of fuel cell module 2, and is injected into generating chamber 10 toward fuel cell stack 14 from many jet outlets 77a.

Air injected into generating chamber 10 contacts the outside surface of individual fuel cell units 16, which is the air electrode side (oxidant gas electrode side) of fuel cell stack 14, and a portion of the oxygen in the air is used for electrical generation. Air injected at the bottom portion of generating chamber 10 via jet outlets 77a rises inside generating chamber 10 as it is utilized for electrical generation. Air rising inside generating chamber 10 causes fuel flowing out from the top end of each individual fuel cell unit 16 to be combusted. The combustion heat from this combustion heats vaporizing section 20a and reformer section 20b in reformer 20, disposed at the top of fuel cell stack 14. The combustion gas produced by the combustion of fuel heats reformer 20 above, then passes through opening portion 21a at the top of reformer 20 and flows into the top side of flow straightening plate 21. Combustion gas flowing into the top side of flow straightening plate 21 is guided through exhaust pathway 21b constituted by flow straightening plate 21 to communication opening 8a, which is an intake opening on air heat exchanger 22. Combustion gas flowing into air heat exchanger 22 from communication opening 8a flows into the end portion of each of the open combustion gas pipes 70, exchanges heat with the generating air flowing through generating air flow path 72 on the outside of each combustion gas pipe 70, and is collected in exhaust gas collection chamber 78. Exhaust gas collected in exhaust gas collection chamber 78 is exhausted to the outside of fuel cell module 2 via exhaust gas discharge pipe 82. Vaporization of water in vaporizing section 20a and the endothermic steam reforming reaction in reformer section 20b are thus promoted, and generating air inside air heat exchanger 22 is preheated.

Figure 12:
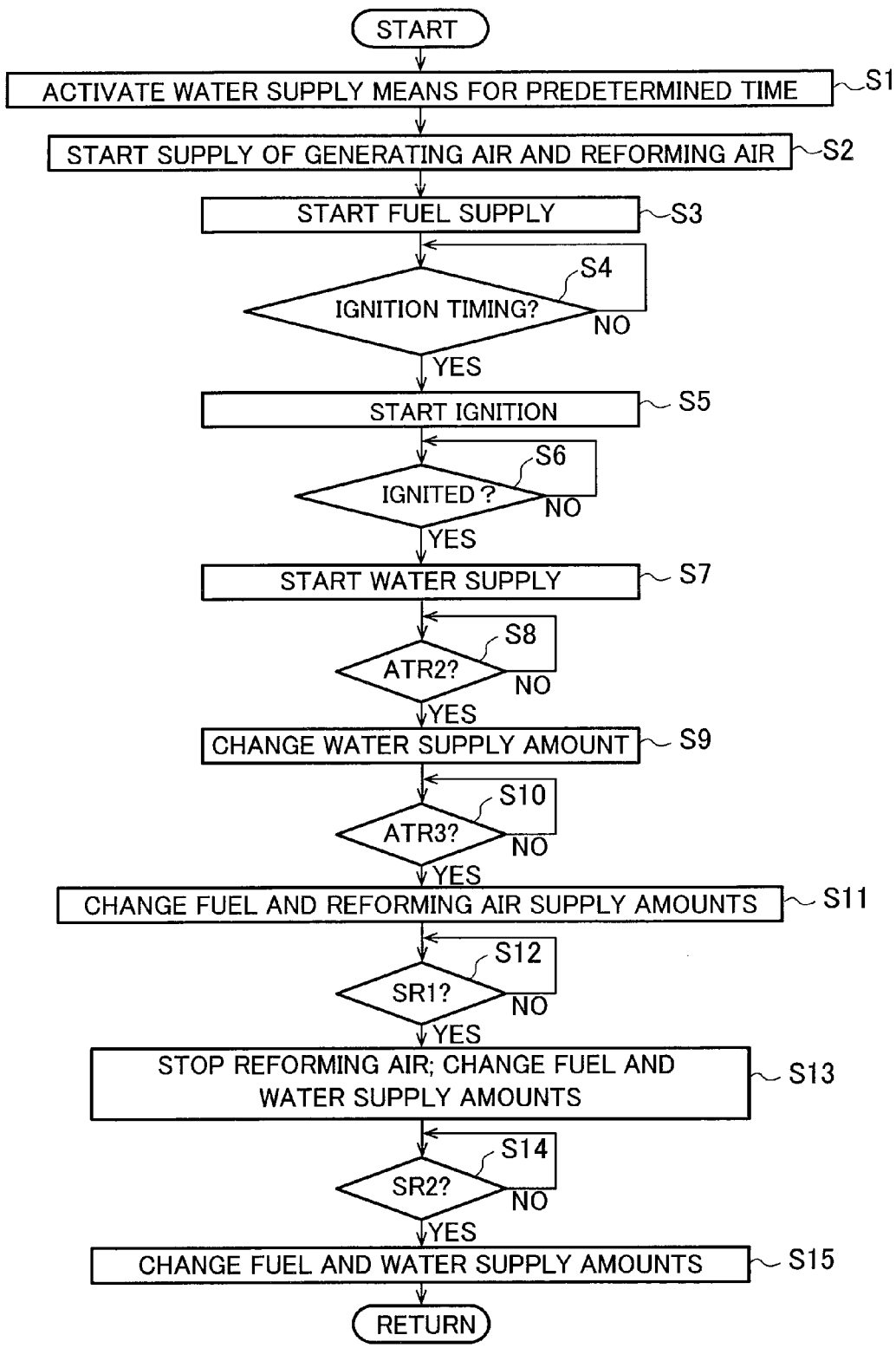
FIG. 12 is a flowchart of control in the startup step of a solid oxide fuel cell device according to an embodiment of the present invention.
Figure 14:
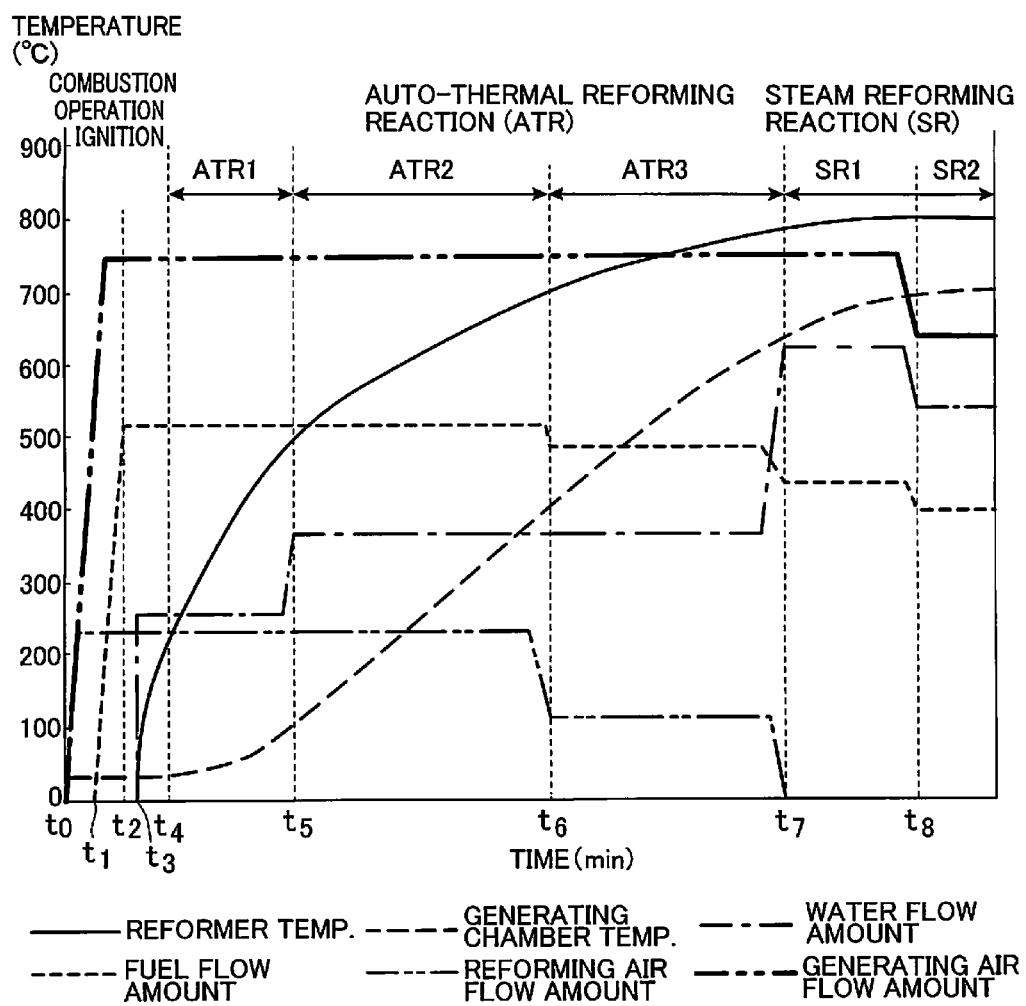
FIG. 14 is a timing chart showing one example of supply amounts of fuel, etc., and temperatures in each section in the startup step, in a solid oxide fuel cell device according to an embodiment of the present invention.

Next, referring to FIGS. 12 through 14, we discuss control during the solid oxide fuel cell device 1 startup step.

FIG. 12 is a flow chart of control in the startup step. FIG. 13 is a table showing the supply amounts of reforming air, water, and generating air at each stage in the startup step. FIG. 14 is a timing chart showing one example of supply amounts of fuel, etc., and temperatures in each section in the startup step. Note, that the index marks on the vertical axis in FIG. 14 indicate temperature; each of the supply amounts for fuel, etc., depict the increase and decrease of these amounts conceptually. The control section 110 includes a microprocessor, a memory, and a program executed by the microprocessor.

In the startup step shown in FIGS. 12 through 14, the temperature of the fuel cell stack 14, which is at room temperature, can be made to rise to a temperature at which electrical generation is possible.

First, at step S1 in FIG. 12, control section 110 activates water flow regulator unit 28, which is a water supply device, for a predetermined time period. During the startup time, the interior of pure water introducing pipe 60 is filled with air from water flow regulator unit 28 up to the vaporizing section 20a on reformer 20. Also, because the flow rate of water supplied by water flow regulator unit 28 is extremely minute, a time lag is generated after activation of water flow regulator unit 28 up until water actually flows into vaporizing section 20a. Therefore, by activating water flow regulator unit 28 for a predetermined time period at the beginning of startup, air in pure water introducing pipe 60 is purged and pure water introducing pipe 60 is filled with reforming water. In the present embodiment, control section 110, after activating water flow regulator unit 28 for approximately 2 minutes at a water supply device rate of approximately 3 cc/min, stops this action, and in the succeeding ignition step stops water flow regulator unit 28.

Next, in step S2 of FIG. 12, supply of generating air and reforming air is commenced (time t0 in FIG. 14). Specifically, control section 110, which is a controller, sends a signal to generating air flow regulator unit 45 serving as oxidant gas for electrical generation supply device, activating same. As described above, generating air is introduced into fuel cell module 2 via generating air introducing pipe 74 and flows into generating chamber 10 through air heat exchanger 22 and generating air supply paths 77. Control section 110, which is a controller, sends a signal to reforming air flow regulator unit 44 serving as a supply device for oxidant gas for electrical generation, activating same. Reforming air introduced into fuel cell module 2 passes through reformer 20 and manifold 66, into individual fuel cell units 16, and flows out of the top end thereof. Note, that at time t0, because fuel is still not being supplied, no reforming reaction takes place inside reformer 20. In the present embodiment the supply amount of generating air begun at time t0 in FIG. 14 is approximately 100 L/min, and the supply amount of reforming air is approximately 10.0 L/min (see FIG. 13: "Prepurge").

Next, supply of fuel is begun at time t1 a predetermined time after time t0 (step S3 in FIG. 12). Specifically, control section 110 sends a signal to fuel flow regulator unit 38, which is a fuel supply device, activating same. Note, that in the present embodiment, the amount of supplied fuel, which starts at time t1, is approximately 5.0 L/min (see "Ignition" in FIG. 13). The amount of reforming air supplied is reduced to approximately 9.0 L/min, and the generating air supply amount is maintained at its previous value. Fuel introduced into fuel cell module 2 passes through reformer 20 and manifold 66, into individual fuel cell units 16, and flows out of the top end thereof. Note, that at time t1, because the reformer temperature is still low, no reforming reaction takes place inside reformer 20.

Next, at step S4 in FIG. 12, a judgment is made as to whether or not ignition should occur. Specifically, a judgment is made as to whether a predetermined time has elapsed from time t1 in FIG. 14, and preparation for ignition has been completed. If the predetermined time has not elapsed since time t1, the processing of step S4 is repeated. At time t2 following the elapse of a predetermined time from time t1, step S5 in FIG. 12 is executed, and the step for igniting the fuel being supplied is started. Specifically, in the ignition step control section 110 sends a signal to ignition device 83 (FIG. 2), which is an ignition means, igniting the fuel flowing out of the top end of each of the individual fuel cell units 16. Ignition device 83 generates repeated sparks in the vicinity of the top end of fuel cell stack 14, igniting fuel flowing out from the top end of each of the individual fuel cell units 16.

Next, at step S6 in FIG. 12, a judgment is made by ignition determination circuit 110a (FIG. 6) built into control section 110 as to whether ignition has completed; i.e., a judgment is made as to whether the fuel flowing out from the top end of the individual fuel cell units 16 is in a state of continuous combustion. If ignition has completed, the system advances to step S7; if it has not completed, the processing of step S6 is repeated. Specifically, ignition determination circuit 110a judges that ignition has completed when the temperature detected by generating chamber temperature sensors 142, which is a temperature detection device dispose near the top end of fuel cell stack 14, has risen by 10° C. or greater above the temperature prior to start of ignition. Alternatively, the present invention can also be constituted so that a judgment as to whether ignition has completed is made based on the temperature detected by exhaust temperature sensor 140 (FIG. 6) for detecting the temperature of exhaust from fuel cell module 2, or on the temperature detected by reformer temperature sensor 148 (FIG. 6) for detecting the temperature of reformer 20, or on a combination of multiple detected temperatures.

If a determination is made at time t3 in FIG. 14 that ignition is complete, the system advances to step S7; following step 7, the post-ignition completion startup steps are executed (time t3 forward in FIG. 14).

If a determination is made that ignition is complete at time t3 in FIG. 14, supply of reforming water is commenced. Specifically, control section 110 sends a signal to water flow regulator unit 28 (FIG. 6), which is a water supply device, activating same. As described above, water flow regulator unit 28 is activated for a predetermined time prior to time t0 in FIG. 14, and air in pure water introducing pipe 60 is purged, while pure water introducing pipe 60 is filled with water. Therefore, water flows into reformer 20 vaporizing section 20a immediately after the start of activation of water flow regulator unit 28. There is, therefore, no time lag created, and steam for steam reforming can be produced at an appropriate time.

In the present embodiment, the supply amount of water started at time t3 is 2.0 cc/min. At time t3, the fuel supply amount is maintained at the previous 5.0 L/min rate (see FIG. 13, "ATR1"). The supply amounts of generating air and reforming air are also maintained at the previous values. Note, that at time t3, the ratio $O_2/C$ between oxygen $O_2$ in reforming air and carbon C in the fuel is approximately 0.32 (see the "$O_2/C$" column in FIG. 13). Here, the ratio $O_2/C=1$ corresponds to a state in which the number of carbon atoms in the fuel is equal to the number of $O_2$ oxygen molecules in the reforming air. Theoretically, therefore, in a state whereby the ratio $O_2/C=0.5$, the reaction of all the carbon atoms C in the fuel with all the oxygen molecules $O_2$ in the reforming air causes all of the carbon in the fuel to become carbon monoxide, and excess carbon is produced when the ratio $O_2/C$ falls below 0.5, causing problems such as carbon deposition to occur. In actuality, however, because the carbon in the fuel reacts with minute amounts of water, etc., contained in the reforming air, it can occur that the value of the ratio $O_2/C$ drops down to approximately 0.4 without producing carbon deposition. Therefore, the ratio $O_2/C=0.32$ in the ATR1 step is a state in which reforming air is insufficient for partial reforming of the entire amount of supplied fuel.

At time t3, the ratio S/C between steam S produced using supplied water and carbon C in the fuel is 0.43 (see the "S/C" column in FIG. 13). Here, the ratio S/C=1 means that the entire amount of carbon contained in the supplied fuel is steam reformed by the supplied water (steam) without a chemical surplus or insufficiency. Therefore, a ratio S/C=0.43 is a state in which reforming water is insufficient for steam reforming the entire amount of supplied fuel. In actuality, because excess carbon is produced in reformer 20 with the steam amount at which S/C=1, the steam amount at which S/C=2.5 is appropriate when steam reforming the entire amount of fuel supplied.

After ignition has occurred at time t3 in FIG. 14, supplied fuel flows out from the top end of each individual fuel cell unit 16 as off-gas, and is here combusted. This combustion heat heats reformer 20 vaporizing section 20a and reformer section 20b disposed above the fuel cell stack 14. Here, vaporization chamber insulation 23 is disposed above reformer 20 (at the top of case 8), by which means the temperatures of vaporizing section 20a and reformer section 20b rise suddenly from room temperature immediately following the start of fuel combustion. Because outside air is introduced into air heat exchanger 22 disposed over vaporization chamber insulation 23, the temperature of air heat exchanger 22, particularly immediately after start of combustion, is low, so this can easily become a cooling source. In the present embodiment, because vaporization chamber insulation 23 is disposed between the top surface of case 8 and the bottom surface of air heat exchanger 22, movement of heat from the reformer 20 disposed at the top inside case 8 to air heat exchanger 22 is constrained, and heat tends to retreat to the vicinity of reformer 20 inside case 8. In addition, the space on the top side of flow straightening plate 21 at the top of reformer 20 is constituted as a gas holding space 21c (FIG. 2) in which fuel gas flow is slowed, therefore, double insulation around vaporizing section 20a is effected, and the temperature rises even more rapidly.

Thus, by the rapid rise in the temperature of vaporizing section 20a, it is possible to produce steam in a short time following the start of combustion of off-gas. Also, because reforming water is supplied to vaporizing section 20a in small amounts at a time, water can be heated to boiling with a very small heat compared to when a large amount of water is stored in vaporizing section 20a, and that the supply of steam be rapidly started. Furthermore, as described above, water flows into vaporizing section 20a without a time lag immediately following the start of activation of water flow regulator unit 28, therefore, excessive temperature rises in the vaporizing section 20a caused by delays in the supply of water, as well as the supply of steam, can be avoided.

Note, that when a certain amount of time has elapsed after the start of off-gas combustion, the temperature of air heat exchanger 22 rises due to exhaust gas flowing into air heat exchanger 22 from combustion chamber 18. Vaporization chamber insulation 23, which insulates between reformer 20 and air heat exchanger 22, is placed on the inside of heat insulation 7. Therefore, vaporization chamber insulation 23 does not suppress the dissipation of heat from fuel cell module 2; rather, it is disposed with the goal of causing the temperature of reformer 20, and particularly vaporizing section 20a thereof, to rise rapidly immediately following combustion of off-gas. As a result, vaporization chamber insulation 23 is designed to have necessary and sufficient thermal resistance to achieve that goal, and has a lower thermal resistance than heat insulation 7.

Thus, at time t4, when the temperature of reformer 20 has risen rapidly, the fuel and reforming air flowing into reformer section 20b via vaporizing section 20a causes the partial oxidation reforming reaction shown in Expression (1).

$$C_mH_n + xO_2 \rightarrow aCO_2 + bCO + CH_2 \qquad (1)$$

Because this partial oxidation reforming reaction is an exothermic reaction, there are local sudden rises in the surrounding temperature when the partial oxidation reforming reaction takes place inside reformer section 20b.

On the other hand, in the present embodiment the supply of reforming water starts from time t3 immediately following the confirmation of ignition, and the temperature of vaporizing section 20a rises suddenly, therefore, at time t4, steam is produced in vaporizing section 20a and supplied to reformer section 20b. That is, after the off-gas has been ignited, water is supplied starting at predetermined duration prior to when reformer section 20b reaches the temperature at which the partial oxidation reforming reaction occurs, and at the point when the partial oxidation reforming reaction temperature is reached, a predetermined amount of water is held in vaporizing section 20a, and steam is produced. Therefore, when the temperature rises suddenly due to the occurrence of the partial oxidation reforming reaction, a steam reforming reaction takes place in which the reforming steam and fuel being supplied to reformer section 20b react. This steam reforming reaction is the endothermic reaction shown in Expression (2); it occurs at a higher temperature than the partial oxidation reforming reaction.

$$C_mH_2 + xH_2O \rightarrow aCO_2 + bCO + CH_2 \qquad (2)$$

Thus, when time t4 in FIG. 14 is reached, the partial oxidation reforming reaction takes place inside reformer section 20b, and the temperature rise caused by the occurrence of the partial oxidation reforming reaction causes the steam reforming reaction to simultaneously occur. Therefore, the reforming reaction which takes place in reformer section 20b starting at time t4 is an auto thermal reforming reaction (ATR) indicated by Expression (3), in which the partial oxidation reforming reaction and the steam reforming reaction are both present. That is, the ATR step begins at time t4.

$$C_mH_n + xO_2 + yH_2O \rightarrow aCO_2 + bCO + CH_2 \qquad (3)$$

Thus, in solid oxide fuel cell device 1 in an embodiment of the present invention, water is supplied during the entire period of the startup step, and partial oxidation reforming reactions (POX) do not occur independently. Note, that in the timing chart shown in FIG. 14, the reformer temperature at time t4 is approximately 200° C. This reformer temperature is lower than the temperature at which the partial oxidation reforming reaction occurs, but the temperature detected by reformer temperature sensor 148 (FIG. 6) is the average temperature of reformer section 20b. In actuality, even at time t4 reformer section 20b has partially reached the temperature at which partial oxidation reforming reactions occur, and a steam reforming reaction is also induced by the reaction heat of the partial oxidation reforming reaction that does arise. Thus, in the present embodiment, after ignition the supply of water begins prior to the time when reformer section 20b reaches the temperature at which partial oxidation reforming reaction occurs, and partial oxidation reforming reactions do not occur independently.

Also, as described above, the partial oxidation reforming reaction is an exothermic reaction, and the steam reforming reaction is an endothermic reaction. For this reason, at the beginning of the startup step when the temperature inside fuel cell module 2 is still low, causing an excessive steam reforming reaction inside reformer section 20b causes the temperature to drop inside reformer section 20b. In the present embodiment we succeed in raising the temperature of reformer section 20b while inducing a steam reforming reaction by setting appropriate values for $O_2/C$ and $S/C$ in the ATR1 step.

Furthermore, carbon monoxide resulting from the auto thermal reforming reaction in reformer section 20b and remaining steam not used for reforming passes through fuel gas supply pipe 64 and manifold 66, reaching the fuel electrodes in each individual fuel cell unit 16. As described above, because nickel is used for the first fuel electrode 90d and second fuel electrode 90e (FIG. 4(b)) in each of the individual fuel cell units 16, carbon monoxide and steam react in the shift reaction shown by Expression (4) due to the catalytic action of the nickel. That is, in a state whereby the temperature of reformer section 20b reaches the temperature at which the partial oxidation reforming reaction occurs, a shift reaction is induced at the fuel electrode in each of the individual fuel cell units 16.

$$CO + H_2O \rightarrow CO_2 + H_2 \qquad (4)$$

In this shift reaction, carbon dioxide and hydrogen are produced from carbon monoxide and steam. Here, since the shift reaction is an exothermic reaction, individual fuel cell units 16 are heated by the occurrence of the shift reaction at the fuel electrodes of each individual fuel cell unit 16. Hydrogen produced by the shift reaction flows out from the top end of each of the individual fuel cell units 16 and is combusted in combustion chamber 18. Therefore, reformer 20 is more strongly heated by the occurrence of the shift reaction.

Here, the shift reaction has an activating temperature range of approximately 500 to 600° C.; it is known to occur between a lower limit temperature of approximately 500° C. and an upper limit temperature of approximately 650° C. At the beginning (time t4) of the startup step, the temperature of each individual fuel cell unit 16 as a whole has not reached the temperature at which the shift reaction occurs, but local temperature rises occur when the high temperature carbon monoxide and steam flowing from reformer 20 come in contact with the surface of the fuel electrodes on each individual fuel cell unit 16. It is thus confirmed that the shift reaction occurs even at the beginning of the startup step. Also, in the present embodiment by appropriately designing the constitution, layout, and size of the fuel gas supply pipe 64 and manifold 66 which guide fuel from reformer 20 to the individual fuel cell units 16, the temperature of carbon monoxide and steam reaching each of the individual fuel cell units 16 is adjusted, and shift reactions are effectively induced. Furthermore, in the present embodiment, by using nickel acting as a catalyst for the shift reaction on the fuel electrodes in individual fuel cell units 16, and by appropriately designing the lengths of individual fuel cell units 16, shift reactions at the fuel electrodes can be actively induced. Note, that in addition to nickel, the use of various precious metals as a shift reaction catalyst is known.

Thus, in solid oxide fuel cell device 1 of an embodiment of the present invention, by disposing reformer 20 vaporizing section 20a above fuel cell stack 14, vaporizing section 20a is directly heated in the off-gas combustion chamber. Also, in solid oxide fuel cell device 1 of the present embodiment, vaporization chamber insulation 23 is disposed above vaporizing section 20a and a gas holding space 21c is formed so that at the beginning of the startup step the temperature of vaporizing section 20a suddenly rises, and steam is supplied at the beginning of the reforming reaction. In addition, in solid oxide fuel cell device 1 of the present embodiment, a shift reaction can be actively induced at the individual fuel cell unit 16 fuel electrodes by appropriately designing each of the individual fuel cell units 16, fuel gas supply pipe 64, and manifold 66. Using these constitutions, the independent occurrence of partial oxidation reforming reactions in the reformer 20 in the startup step is prevented, and an auto thermal reforming reaction is brought about from the start of the reforming reaction. Thus, excess temperature rise and degradation of reformer 20 and the reforming catalyst due to thermal runaway by reformer section 20b are suppressed. In solid oxide fuel cell device 1 of the present embodiment, by utilizing the reaction heat of the shift reaction and the heat of combustion of hydrogen produced by the shift reaction, the temperature of reformer 20 and fuel cell stack 14 can be quickly and stably caused to rise using the ATR1 step, while omitting the POX step which causes partial oxidation reforming reactions to occur independently.

Next, in step S8 of FIG. 12, a judgment is made as to whether the temperature of reformer 20 has reached a predetermined temperature for transition to the ATR2 step. If it has reached the temperature for transition to the ATR2 step, the system advances to step S9; if not, the processing in step S8 is repeated. In the present embodiment, when the temperature detected by reformer temperature sensor 148 reaches approximately 500° C. or greater, the system is transitioned from the ATR1 step to the ATR2 step.

Next, in step S9, the water supply amount is changed from 2.0 cc/min to 3.0 cc/min (see FIG. 13, "ATR2 Step" and time t15 in FIG. 14). For the fuel supply amount, reforming air supply amount, and generating air supply amount, the previous values are maintained. The ratio S/C for steam and carbon in the ATR2 step is thereby increased to 0.64, whereas the ratio between reforming air and carbon $O_2/C$ is maintained at 0.32. Thus, by increasing the steam to carbon ratio S/C while holding fixed the reforming air to carbon ratio $O_2/C$, the amount of steam-reformable carbon is increased without reducing the amount of partial oxidation reformable carbon. By so doing, the temperature of reformer section 20b can be raised and the amount of steam-reformed carbon increased, while reliably avoiding the risk of carbon deposition in reformer section 20b.

In addition, in step S10 of FIG. 12 a judgment is made as to whether the temperature of fuel cell stack 14 has reached a predetermined temperature for transition to the ATR3 step. If it has reached the temperature for transition to the ATR3 step, the system advances to step S11; if not, the processing in step S10 is repeated. In the present embodiment, when the temperature detected by generating chamber temperature sensors 142 reaches approximately 400° C. or greater, the system is transitioned from the ATR2 step to the ATR3 step.

Next, in step S11, the fuel supply amount is changed from 5.0 L/min to 4.0 L/min, and the reforming air supply amount is changed from 9.0 L/min to 6.5 L/min (see the "ATR3 Step" in FIG. 13 and time t6 in FIG. 14). For the water supply amount and generating air supply amount, the previous values are maintained. The ratio S/C for steam and carbon in the ATR3 step is thereby increased to 0.80, whereas the ratio between reforming air and carbon $O_2/C$ is reduced to 0.29. Thus, by reducing the reforming air supply amount while maintaining a fixed water supply amount, the amount of partial oxidation reformable carbon can be reduced and the proportion of the steam reforming reaction increased while avoiding the risk of temperature drops caused by sudden increases in steam reforming. The ATR step is in this way executed by division into three stages: ATR1, ATR2, and ATR3, but water flow regulator unit 28 is controlled so that the water supply amount in the ATR1 step, which is the first of the ATR steps, is the smallest. By executing the ATR step in multiple divided stages, the supply fractions of fuel, reforming air, and reforming water are changed in each stage, so that the temperature of the reformer 20 and fuel cell stack 14 are raised by the auto thermal reforming reaction, while temperature drops due to excessive steam reforming are avoided.

In addition, in step S12 of FIG. 12 a judgment is made as to whether the temperature of fuel cell stack 14 has reached a predetermined temperature for transition to the SR1 step. If it has reached the temperature for transition to the SR1 step, the system advances to step S13; if not, the processing in step S12 is repeated. In the present embodiment, when the temperature detected by generating chamber temperature sensors 142 reaches approximately 550° C. or greater, the system is transitioned to the SR1 step.

Next, in step S13, the fuel supply amount is changed from 4.0 L/min to 3.0 L/min, and the water supply amount is changed from 3.0 cc/min to 7.0 cc/min (see the "SR1 Step" in FIG. 13 and time t7 in FIG. 14). Supply of reforming air is stopped, and the generating air supply amount is maintained at the previous value. Thus, in the SR1 step, the steam reforming reaction is already occurring within reformer section 20b, and the steam to carbon ratio S/C is set at an appropriate 2.49 for steam reforming the entire amount of supplied fuel. At time t7 in FIG. 14, the temperatures of both reformer 20 and fuel cell stack 14 have risen sufficiently, therefore, the steam reforming reaction can be stably brought about even if no partial oxidation reforming reaction is occurring in reformer section 20b.

In addition, in step S14 of FIG. 12, a judgment is made as to whether the temperature of fuel cell stack 14 has reached a predetermined temperature for transition to the SR2 step. If it has reached the temperature for transition to the SR2 step, the system advances to step S15; if not, the processing in step S14 is repeated. In the present embodiment, when the temperature detected by generating chamber temperature sensors 142 reaches approximately 600° C. or greater, the system is transitioned to the SR2 step.

Next, in step S15, the fuel supply amount is changed from 3.0 L/min to 2.5 L/min, and the water supply amount is changed from 7.0 cc/min to 6.0 cc/min (see the "SR2 Step" in FIG. 13 and time t8 in FIG. 14). The generating air supply amount is maintained at the previous value. In the SR2 step the water to carbon ratio S/C is thus set to 2.56. Thus, in the present embodiment the only steps executed as fuel reforming steps in the startup step are the ATR step (the ATR1 step, ATR2 step, and ATR3 step) and the SR step (the SR1 step and SR2 step).

Furthermore, after the SR2 step has been executed for a predetermined time, the system transitions to the electrical generating step, and the processing shown in the flow chart in FIG. 12 is ended. In the electrical generating step, power is extracted from fuel cell stack 14 to inverter 54 (FIG. 6), and electrical generation is begun. Note, that in the electrical generation step, fuel is already reformed by steam reforming in reformer section 20b.

Using a solid oxide fuel cell device 1 according to an embodiment of the present invention, in an off-gas combustion cell burner-type of solid oxide fuel cell device, steam can be produced for steam reforming at the start of the startup step, therefore, vaporizing section 20a is disposed above multiple individual fuel cell units 16, adjacent to reformer section 20b. By adopting such a constitution, early production of steam is enabled, and thermal runaway of reformer section 20b is prevented by controlling reforming air flow regulator unit 44 and water flow regulator unit 28 so that partial oxidation reforming reactions do not occur independently in reformer section 20b.

Using the solid oxide fuel cell device 1 of the present embodiment, only the ATR step (times t4-t7 in FIG. 14), in which the partial oxidation reforming reaction and steam reforming reaction occur simultaneously, and the SR step (time t4—in FIG. 14), in which only the steam reforming reaction occurs, are executed in reformer section 20b, therefore, no independent occurrence of the exothermic partial oxidation reforming reaction occurs in reformer section 20b, and degradation and damage to reformer section 20b by thermal runaway of the reforming reaction can be prevented.

Furthermore, using the solid oxide fuel cell device 1 of the present embodiment, reforming air flow regulator unit 44 is controlled (see the $O_2/C$ column in FIG. 13) so that the oxygen $O_2$ proportion is at all times less than the ratio $O_2/C=0.4$ between oxygen $O_2$ in the reforming oxidant gas and carbon in the fuel, therefore, oxygen $O_2$ is insufficient for partial oxidation reforming of the entire amount of supplied fuel, and a steam reforming reaction is always induced such that the reformer can be reliably protected.

Using the solid oxide fuel cell device 1 of the present embodiment, the ATR step is divided into ATR1, ATR2, and ATR3 and executed (times t4 through t7 in FIG. 14), and in the beginning stage of the ATR step the water supply amount is reduced (see the "Pure Water Flow Rate" column in FIG. 13), therefore, heat absorption by the steam reforming reaction occurring at the beginning of the startup step, in which the reformer temperature is low, is suppressed, and the temperature of the reformer can be reliably raised.

Furthermore, using the solid oxide fuel cell device 1 of the present embodiment, the supplying of water (time t3 in FIG. 14) by water flow regulator unit 28 is started prior to the temperature of reformer section 20b reaching the temperature at which a partial oxidation reforming reaction occurs, therefore, when pre-supplied water is turned to steam inside vaporizing section 20a and the partial oxidation reforming reaction temperature is reached (time t4 in FIG. 14), steam can be reliably supplied to reformer section 20b.

Also, using the solid oxide fuel cell device 1 of the present embodiment, the supply of water is started after ignition (step S6→S7 in FIG. 12), therefore, steam supply delays and sudden steam reforming reaction occurrences can be avoided, and the independent occurrence of partial oxidation reforming reactions and temperature drops in reformer section 20b can be reliably prevented.

Furthermore, using the solid oxide fuel cell device 1 of the present embodiment, water flow regulator unit 28 is activated (step S1 in FIG. 12) before executing the ignition step (steps S5, S6 in FIG. 12), therefore, air in the pipes guiding water to vaporizing section 20a can be purged, and the time lag in supplying water when activating the water flow regulator unit 28 after ignition can be shortened, so that water can be supplied to reformer section 20b at an appropriate timing.

Also, using the solid oxide fuel cell device 1 of the present embodiment, the reforming air supply is maintained at a fixed amount when transitioning from the ATR1 step to the ATR2 step (time t5 in FIG. 14), so the proportion of the steam reforming reaction is increased while maintaining the amount of carbon reformable by the partial oxidation reforming reaction, and the risks of carbon deposition in reformer section 20b and temperature drops in reformer section 20b are constrained.

Furthermore, in the solid oxide fuel cell device 1 of the present embodiment, a fixed fuel supply amount is maintained when transitioning from the ATR1 step to the ATR2 step (time t5 in FIG. 14), therefore, the reforming reaction can be prevented from becoming unstable when the reformer section 20b temperature is low, and the reformer section 20b temperature can be stably raised.

In addition, in the solid oxide fuel cell device 1 of the present embodiment, the fuel supply amount and reforming air supply amount are changed when the reformer section 20b temperature transitions from the comparatively elevated temperature ATR2 step (time t6 in FIG. 14), therefore, the risk of destabilization of the reforming reaction can be minimized.

We have described above a preferred embodiment of the present invention, but various changes may be added to the above-described embodiments.

Figure 15:
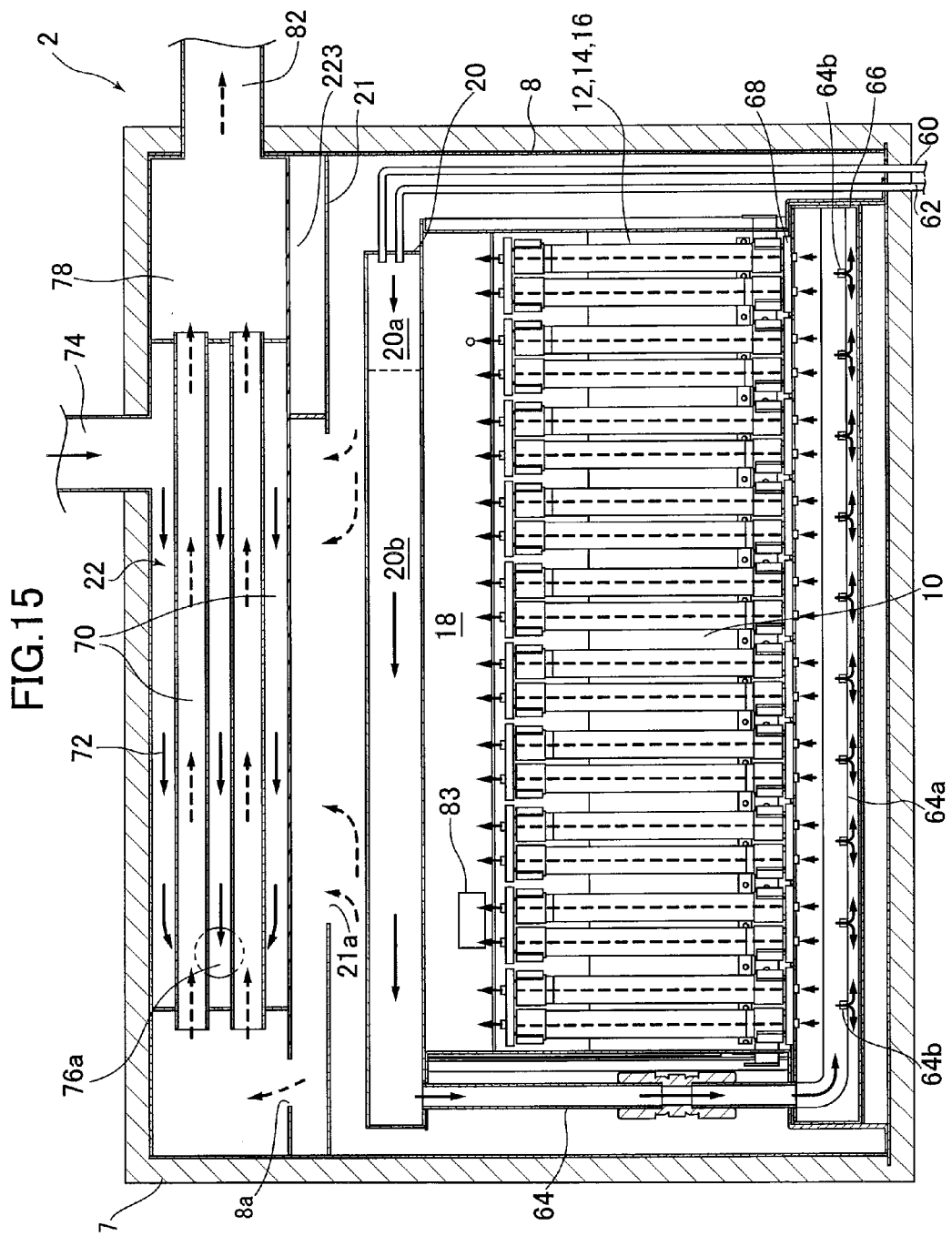
FIG. 15 is a sectional diagram showing a vaporization chamber temperature rise insulation layer in a solid oxide fuel cell device according to an embodiment of the present invention.

The embodiment described above was furnished with a vaporization chamber insulation 23 disposed between the top surface of case 8 and air heat exchanger 22 as a vaporization chamber temperature raising insulation layer, but as a variant example the vaporization chamber temperature raising insulation layer can also be constituted as shown in FIG. 15.

In the variant example shown in FIG. 15, the vaporization chamber temperature raising insulation layer is constituted by an air layer 223 formed between vaporizing section 20a and air heat exchanger 22. Air layer 223 is constituted by a sealed space between vaporizing section 20a and air heat exchanger 22. Using an air layer 223 thus constituted, the movement of heat from vaporizing section 20a to air heat exchanger 22 is constrained, and the temperature of reformer 20 can be rapidly raised at the beginning of the startup step. Also, in the variant example shown in FIG. 15, air layer 223 is comprised by a sealed space, but air layer 223 can also be constituted by an open space not communicating with combustion chamber 18, or by a gas retaining space in which gas is held, formed so that exhaust within combustion chamber 18 has difficulty flowing into it.

What is claimed is:

1. A solid oxide fuel cell system, in which excess fuel not used to generate electricity flows out from one ends of fuel cell units and is combusted to heat a reformer, the solid oxide fuel cell system comprising:
   a fuel cell module including a plurality of fuel cell units in each of which a fuel electrode is formed on an interior passage for passing the fuel therethrough;
   a reformer disposed inside the fuel cell module above the plurality of fuel cell units, wherein the reformer is configured to produce hydrogen and a byproduct including carbon monoxide generated from a concurrent occurrence of a partial oxidation reforming (POX) reaction caused by a chemical reaction between the fuel and reforming oxidant gas, and a steam reforming (SR) reaction caused by a chemical reaction between the fuel and reforming steam;
   a vaporization chamber disposed above the plurality of fuel cell units and adjacent to the reformer, the vaporization chamber being configured to vaporize supplied water to produce the reforming steam;
   a combustion chamber disposed inside the fuel cell module below the reformer and the vaporization chamber above the fuel cell units, wherein the combustion chamber is configured to combust the excess fuel flowing out from the interior passage of each of the fuel cell units to heat the reformer and the vaporization chamber located above the combustion chamber;
   a fuel supply device configured to supply the fuel to the reformer to thereby feed the reformed fuel into each of the fuel cell units;
   a reforming oxidant gas supply device configured to supply the reforming oxidant gas to the reformer;
   a water supply device configured to supply the reforming water to the vaporization chamber;
   an oxidant gas supply device configured to supply oxidant gas for electrical generation to an oxidant gas electrode formed on an exterior of each of the plurality of fuel cell units;
   an ignitor provided in the combustion chamber and operable to ignite the excess fuel flowing out of the fuel cell units;
   a temperature sensor arranged to detect an operation temperature of the fuel cell module; and
   a controller programmed to execute a startup process of the fuel cell module to simultaneously effect the POX reaction and the SR reaction in the reformer so that during the startup process, the plurality of fuel cell units can be heated from a room temperature to a temperature at which electrical generation is possible,
   wherein the controller is programmed to execute the startup process in a sequence of operations comprising:
   operating the reforming oxidant gas supply device and the fuel supply device to start supplying the reforming oxidant gas and the fuel to the reformer at the room temperature;
   subsequent to a start of supply of the reforming oxidant gas and the fuel to the reformer, operating the ignitor to ignite the excess fuel flowing out of the fuel cell units; and
   upon a confirmation by the controller that a temperature detected by the temperature sensors reaches an ignition temperature, operating the water supply device to start supplying the reforming water to the reformer so that during the entire period of the startup process, the POX reaction will not occur solitarily in the reformer, wherein the ignition temperature is indicative of combustion of the excess fuel and lower than a temperature at which the POX reaction is occurrable.

2. The solid oxide fuel cell device of claim 1, wherein the controller is programmed to execute an auto thermal reforming (ATR) reaction in the reformer in which the POX reaction and the SR steam reforming reaction occur simultaneously in the reformer, and the controller is further programmed to execute the startup process in such a manner that only the ATR reaction and the SR reaction will occur in the reformer during the entire period of the startup process.

3. The solid oxide fuel cell device of claim 2, wherein the controller is programmed to operate the reforming oxidant gas supply device to adjust a supply amount of the reforming oxidant gas in such a manner that a ratio between oxygen $O_2$ in the reforming oxidant gas and carbon in the fuel will be at all times less than a ratio $O_2/C=0.4$, at which ratio all of the fuel is reformable in the reformer only through the POX reaction.

4. The solid oxide fuel cell device of claim 2, wherein the controller is programmed to execute the ATR reaction in multiple stages, and the controller is programmed to operate the water supply device in an initial stage of the ATR reaction to supply the reforming water at a rate which is smallest throughout the startup process.

5. The solid oxide fuel cell device of claim 1, wherein the controller is programmed to temporarily operate the water supply device to supply the reforming water for a limited time before operating the ignitor to ignite the excess fuel.

6. The solid oxide fuel cell device of claim 4 wherein at a transition from the initial stage of the ATR reaction (an ATR1 reaction) to a second stage of the ATR reaction (an ATR2 reaction), the controller is programmed to operate the water supply device to increase supply of the reforming water while operating the reforming oxidant gas supply device to maintain supply of the reforming oxidant gas at a fixed supply rate.

7. The solid oxide fuel cell device of claim 6, wherein the controller is programmed to operate the fuel supply device to maintain supply of the fuel at a fixed supply rate at the transition from the ATR1 reaction to the ATR2 reaction.

8. The solid oxide fuel cell device of claim 7, wherein at a transition from the ATR2 reaction to a third stage of the ATR reaction (an ATR3 reaction), the controller is programmed to operate the fuel supply device and the reforming oxidant gas supply device to reduce supply rates of the fuel and the reforming oxidant gas, while operating the water supply device to maintain supply of the reforming water at a constant supply rate.

9. The solid oxide fuel cell device of claim 3, further comprising:
- an external heat insulation material arranged to reduce heat dissipation to outside of the fuel cell module;
- a heat exchanger disposed above the vaporization chamber and configured to exchange heat between combustion gas produced in the combustion chamber and the oxidant gas for electrical generation introduced into the fuel cell module so as to preheat the oxidant gas for electrical generation before the oxidant gas is supplied to the plurality of fuel cell units; and
- a vaporization chamber temperature-raising insulation layer disposed between the heat exchanger and the vaporization chamber and configured to suppress migration of heat from the vaporization chamber to the heat exchanger to thereby facilitate an increase of a temperature of the vaporization chamber.

10. The solid oxide fuel cell device of claim 9, wherein a thermal resistance of the vaporization chamber temperature-raising insulation layer is less than a thermal resistance of the external heat insulation material.

11. The solid oxide fuel cell device of claim 10, wherein the vaporization chamber temperature-raising insulation layer is disposed to entirely cover the vaporization chamber.

12. The solid oxide fuel cell device of claim 11, wherein the vaporization chamber temperature-raising insulation layer comprises one of (i) a vaporization chamber insulating material disposed between the heat exchanger and the vaporization chamber and (ii) a gas retaining space provided between the heat exchanger and the vaporization chamber.

13. The solid oxide fuel cell device of claim 12, further comprising an exhaust pathway disposed between a reforming section/vaporization chamber and the vaporization chamber temperature-raising insulation layer, wherein the exhaust pathway is configured to guide combustion gas produced in the combustion chamber to the heat exchanger.

* * * * *